United States Patent [19]
Ota et al.

[11] Patent Number: 6,076,898
[45] Date of Patent: Jun. 20, 2000

[54] BRAKING CONTROL SYSTEM FOR A FOUR-WHEEL DRIVE VEHICLE

[75] Inventors: Toshinobu Ota, Ama gun; Hiroyuki Nagai, Nagoya; Yosuke Takahira, Toyota; Toshimi Ishikawa, Anjo, all of Japan

[73] Assignee: Aisin Seiki Kabushiki Kaisha, Kariya, Japan

[21] Appl. No.: 09/061,047

[22] Filed: Apr. 16, 1998

[30] Foreign Application Priority Data

| Apr. 18, 1997 | [JP] | Japan | 9-116410 |
| Oct. 24, 1997 | [JP] | Japan | 9-309719 |
| Oct. 24, 1997 | [JP] | Japan | 9-310014 |

[51] Int. Cl.$^7$ ............................................. B60T 8/24
[52] U.S. Cl. ................................ 303/139; 303/143
[58] Field of Search ........................... 303/139, 140, 303/141, 143, 152, 122, 146, 190, 191, 192, 24.1; 180/197, 370

[56] References Cited

U.S. PATENT DOCUMENTS

| 5,043,896 | 8/1991 | Sol .................................. 364/426.02 |
| 5,423,601 | 6/1995 | Sigl . |
| 5,775,784 | 7/1998 | Koga et al. ............................ 303/152 |
| 5,915,801 | 6/1999 | Taga et al. ............................ 303/152 |
| 5,947,221 | 9/1999 | Taniguchi et al. ...................... 180/197 |
| 5,957,552 | 8/1999 | Claussen et al. ....................... 303/192 |

FOREIGN PATENT DOCUMENTS

| 39 33 652 | 4/1991 | Germany . |
| 8-133054 | 5/1996 | Japan . |
| 96/11826 | 4/1996 | WIPO . |

*Primary Examiner*—Robert J. Oberleitner
*Assistant Examiner*—Melanie Talavera
*Attorney, Agent, or Firm*—Burns, Doane, Swecker & Mathis, LLP

[57] ABSTRACT

The present invention is directed to a braking control system for controlling a braking force applied to each of front and rear wheels of a four-wheel drive vehicle, which has a front differential gear connected to the front wheels, a rear differential gear connected to the rear wheels, and a center differential gear connected to the front and rear differential gears. A wheel speed sensor is provided for detecting wheel speeds of the wheels. A non-contact detector is provided for determining whether at least one wheel is not contacting the ground in the vehicle's path, on the basis of the wheel speeds detected by the wheel sensor. A downhill detector is provided for determining whether the vehicle's path is on a downhill road. An engine brake detector is provided for determining whether the vehicle is under an engine brake. And, a braking force controlling device is provided for controlling a braking force applied to each of the wheels independently, and adapted to apply the braking force to at least one of the wheels, when the downhill detector determines that the vehicle's path is on the downhill road, the engine brake detector determines that the vehicle is under the engine brake, and the non-contact detector determines that the at least one wheel is not contacting the ground.

15 Claims, 18 Drawing Sheets

BRAKING CONTROL SYSTEM FOR A FOUR-WHEEL DRIVE VEHICLE

BACKGROUND OF THE INVENTION

1. Field of the Invention

The present invention relates to a braking control system for controlling a braking force applied to each of four driven wheels of a four-wheel drive vehicle having a center differential gear, and more particularly to the control system which keeps a stable driving condition of the four-wheel drive vehicle when the vehicle goes downhill.

2. Description of the Related Arts

An ordinary passenger vehicle has a pair of wheels at each of its front and rear sides. Either the front wheels or the rear wheels of that vehicle are operatively connected with an engine to be driven directly thereby, while the rest of the wheels are not connected with the engine so as to be served as non-driven wheels. A vehicle having the driven wheels at its front side is called a front drive vehicle, while a vehicle having the driven wheels at its rear side is called a rear drive vehicle. And, a vehicle having the driven wheels at both of the front and rear sides is called a four-wheel drive (4WD) vehicle. As for a driving system of the four-wheel drive vehicle, various types of the system are known, such as a part time system, full time system, and the like. According to the full time system, all of the front and rear wheels are connected through a front differential gear, a rear differential gear, and a center differential gear.

Also, in order to prevent an acceleration slip from occurring in the case where an excessive driving force is applied when starting or accelerating the vehicle, an acceleration slip control system, i.e., a so-called traction control system is popular in the market, as disclosed in a Japanese Patent Laid-open Publication No.8-133054, for example.

According to the above-described part time system of the four-wheel drive vehicle, when the vehicle turns with its four wheels driven, its cornering maneuver is difficult due to a rotational difference between the front and rear wheels. This is called a phenomenon of tight corner braking. According to the full time system of the four-wheel drive vehicle, the driving force transmitted to the wheels through a transmission is effectively distributed to the front and rear wheels by the center differential gear, and the rotational difference between the front and rear wheels is compensated, so that a smooth cornering maneuver can be ensured. However, the center differential gear will cause another problem. That is, if one of the front and rear wheels slips to rotate freely, the driving force will not be transmitted to the rest of the wheels at all. In order to avoid this, a center differential locking mechanism for locking the center differential gear manually has been introduced.

According to the full time system of the four-wheel drive vehicle, however, if the center differential gear is locked by the center differential locking mechanism, the phenomenon of tight corner braking will be caused, as described before. As a result, the vehicle's cornering maneuver will be difficult. In this case, therefore, the vehicle's driver must reduce the vehicle speed slow enough to turn the vehicle properly. As a countermeasure against this, simply removing the center differential locking mechanism will need another countermeasure, when one of the wheels will slip to rotate freely, as described before. The traction control system may be used as that countermeasure, so that the vehicle can be pulled out from a mud, for example. However, when the vehicle travels on a rough and downhill road with an engine brake operated, for example, if one of the wheels slips to rotate freely, the engine torque to be used for braking the wheels will not be transmitted to the wheels which contact the ground in the vehicle's path (hereinafter, simply referred to as contact wheel), but to the freely rotating wheel (hereinafter, simply referred to as non-contact wheels). According to the present application, the non-contact wheel is not limited to mean the freely rotating wheel, but means such a wheel that is substantially unable to transmit a load of the vehicle to the ground. Thus, the engine torque will be transmitted to the non-contact wheel, to rotate the same in the reverse direction. When the engine brake is operated on the downhill road, therefore, a certain countermeasure is needed. As a countermeasure in that case, a braking force corresponding to the engine brake may be applied to the front wheels, considering a load shift of the vehicle, which is caused when the vehicle goes downhill with the engine brake operated. As another countermeasure in that case, a braking force may be applied to the non-contact wheel, with the engine brake applied to the rest of the wheels properly.

In the case where those countermeasures are employed, the non-contact wheel is rotated in the reverse direction, as described above, so that if the wheel speed of the wheel rotating in the vehicle's moving direction is of a positive value, the wheel speed of the non-contact wheel will be of a negative value. However, an ordinary wheel speed sensor used for detecting the wheel speed can not identify its rotating direction. Since the sensor can not distinguish between the normal rotation and the reverse rotation, its output signal indicates the positive value, even if it is output when the wheel is rotating in the reverse direction. Therefore, the non-contact wheel is erroneously determined to be contacting the ground. As a result, the non-contact wheel or the front wheels may not be applied with a desired braking force. As a countermeasure to this, it is possible to provide a device for enabling the sensor to identify the rotational direction, but the device or its control will be complicated.

SUMMARY OF THE INVENTION

Accordingly, it is an object of the present invention to provide a braking control system for use in a four-wheel drive vehicle having a center differential gear, wherein a braking operation to the vehicle can be effectively performed, even if at least one wheel of the vehicle is not contacting the ground in the vehicle's path, when the vehicle goes downhill with an engine brake operated.

It is another object of the present invention to provide a braking control system for use in a four-wheel drive vehicle having a center differential gear, wherein it can be easily and properly determined whether at least one wheel of the vehicle is contacting the ground in the vehicle's path, or not, when the vehicle goes downhill with an engine brake operated.

In accomplish the above and other objects, a braking control system is provided for controlling a braking force applied to each of front and rear wheels of a four-wheel drive vehicle having a front differential gear connected to the front wheels, a rear differential gear connected to the rear wheels, and a center differential gear connected to the front and rear differential gears. A wheel speed sensor is provided for detecting wheel speeds of the front and rear wheels of the vehicle. A non-contact detector is provided for determining whether at least one wheel of the vehicle is not contacting the ground in the vehicle's path, on the basis of the wheel speeds detected by the wheel sensor. A downhill detector is provided for determining whether the vehicle's path is on a downhill road. An engine brake detector is provided for determining whether the vehicle is under an engine brake. And, a braking force controlling device is provided for controlling a braking force applied to each of the front and rear wheels independently. The braking force controlling device is adapted to apply the braking force to at least one of the front and rear wheels of the vehicle, when the downhill detector determines that the vehicle's path is on the downhill road, the engine brake detector determines that the vehicle is under the engine brake, and the non-contact detector determines that the at least one wheel is not contacting the ground.

It is preferable that the non-contact detector includes a slip detector which is adapted to detect a slip of each of the wheels on the basis the wheel speeds detected by the wheel speed sensor, and the non-contact detector is adapted to determine that the at least one wheel is not contacting the ground, when the slip detector detects the slip of the at least one wheel.

The braking control system may further include a device for calculating an estimated vehicle speed on the basis of the wheel speeds detected by the wheel speed sensor, and the slip detector may include a slip rate calculating device for calculating a slip rate of each of the wheels on the basis of the wheel speeds and the estimated vehicle speed, so that the slip detector may detect the slip of the at least one wheel on the basis of the slip rate calculated by the slip rate calculating device.

The non-contact detector may be adapted to determine that the at least one wheel is not contacting the ground in the vehicle's path, when the wheel speed of the at least one wheel is lower than a first threshold level obtained by subtracting a first predetermined value from the estimated vehicle speed.

The braking control system may further include a contact detector which is adapted to determine that the at least one wheel is contacting the ground in the vehicle's path, when the wheel speed of the at least one wheel continues to be higher than a second threshold level obtained by subtracting a second predetermined value from the estimated vehicle speed, for a predetermined period of time, and the braking control system may be adapted to release the braking force applied to the at least one wheel, when the contact detector determines that the at least one wheel is contacting the ground. The contact detector may be adapted to determine that the at least one wheel is contacting the ground in the vehicle's path, when the wheel speed of the at least one wheel continues to be higher than the second threshold level obtained by subtracting the second predetermined value from the estimated vehicle speed, and lower than a third threshold level obtained by adding a third predetermined value to the estimated vehicle speed, for a predetermined period of time.

The braking force controlling device may be adapted to apply the braking force to both of the front wheels of the vehicle, when the downhill detector determines that the vehicle's path is on the downhill road, the engine brake detector determines that the vehicle is under the engine brake, and the non-contact detector determines that the at least one wheel is not contacting the ground.

Or, the braking force controlling device may be adapted to apply the braking force to the at least one wheel which is not contacting the ground, when the downhill detector determines that the vehicle's path is on the downhill road, the engine brake detector determines that the vehicle is under the engine brake, and the non-contact detector determines that the at least one wheel is not contacting the ground.

The downhill detector may include a tilt detector for detecting a tilt angle of the vehicle, and may be adapted to determine that the vehicle's path is on the downhill road, when the tilt detector detects the tilt angle tilted more than a predetermined angle, provided that the moving direction of the vehicle corresponds to the downward direction of the downhill road, for a predetermined period of time.

The engine brake detector may include a gear position detector for detecting a gear position of a transmission of the vehicle, and may be adapted to determine that the vehicle is under the engine brake, at least when the gear position detector detects a predetermined gear position for providing a relatively low vehicle speed, and when the downhill detector determines that the vehicle's path is on the downhill road.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
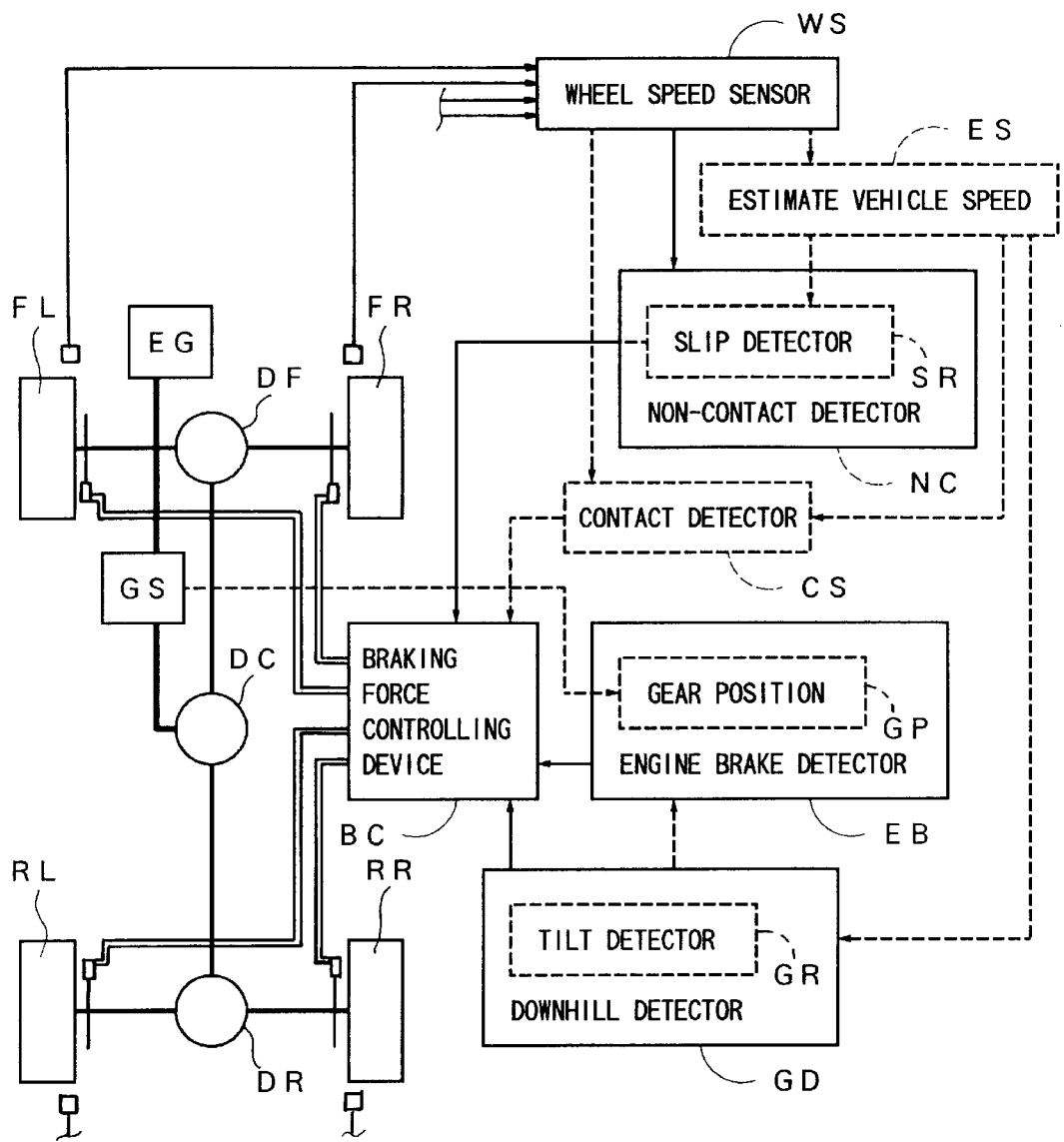
FIG. 1 is a general block diagram illustrating a braking control system according to an embodiment of the present invention.

Referring to FIG. 1, there is schematically illustrated a braking control system for a four-wheel drive vehicle according to an embodiment of the present invention, wherein wheel brake cylinders Wfl, Wfr, Wrl, Wrr are operatively mounted on front and rear wheels FL, FR, RL, RR, respectively, for applying a braking force thereto. The vehicle has a front differential gear DF which is connected to the front wheels FL, FR, a rear differential gear DR which is connected to the rear wheels RL, RR, and a center differential gear DC which is connected to the front and rear differential gears DF, DR. Therefore, it is so arranged that a driving force of an engine EG is output from a transmission GS, and transmitted to each wheel through the center differential gear DC, and then the front and rear differential gears DF, DR. A wheel speed sensor WS is provided for detecting wheel speeds of the front and rear wheels FL, FR, RL, RR. A non-contact detector NC is provided for determining whether at least one wheel of the vehicle is not contacting the ground in the vehicle's path, on the basis of the wheel speeds which are detected by the wheel speed sensor WS. A downhill detector GD is provided for determining whether the vehicle's path is on a downhill road. An engine brake detector EB is provided for determining whether the vehicle is under an engine brake. And, a braking force controlling device BC is provided for controlling a braking force applied to each of the front and rear wheels FL, FR, RL, RR independently, The braking force controlling device BC is adapted to apply the braking force to at least one of the front and rear wheels, when the downhill detector GD determines that the vehicle's path is on the downhill road, the engine brake detector EB determines that the vehicle is under the engine brake, and the non-contact detector NC determines that the at least one wheel is not contacting the ground.

As indicated by broken lines in FIG. 1, the non-contact detector NC may include a slip detector SR which detects a slip of each of the wheels on the basis the wheel speeds which are detected by the wheel speed sensor WS. The non-contact detector NC is adapted to determine that the at least one wheel is not contacting the ground, when the slip detector SR detects the slip of the at least one wheel. The slip detector SR may include a slip rate calculating device (not shown) for calculating a slip rate of each of the wheels on the basis of the wheel speeds and an estimated vehicle speed, which is calculated by an estimated vehicle speed calculating device ES as indicated by a broken line in FIG. 1 on the basis of the wheel speeds detected by the wheel speed sensor WS, so that the slip detector SR can detect the slip of the at least one wheel on the basis of the slip rate.

The non-contact detector NC may be adapted to determine that the at least one wheel is not contacting the ground in the vehicle's path, when the wheel speed of the at least one wheel is lower than a first threshold level which is obtained by subtracting a first predetermined value from the estimated vehicle speed. The system may further include a contact detector CS as indicated by broken lines in FIG. 1, which is adapted to determine that the at least one wheel is contacting the ground in the vehicle's path, when the wheel speed of the at least one wheel continues to be higher than a second threshold level which is obtained by subtracting a second predetermined value from the estimated vehicle speed, for a predetermined period of time. And, the braking force controlling device BC may be adapted to release the braking force applied to the at least one wheel, when the contact detector CS determines that the at least one wheel is contacting the ground. The contact detector CS may be adapted to determine that the at least one wheel is contacting the ground in the vehicle's path, when the wheel speed of the at least one wheel continues to be higher than the second threshold level which is obtained by subtracting the second predetermined value from the estimated vehicle speed, and lower than a third threshold level which is obtained by adding a third predetermined value to the estimated vehicle speed, for a predetermined period of time. The same value may be provided for the first, second, third predetermined values.

Preferably, the braking force controlling device BC is arranged to apply the braking force to both of the front wheels FL, FR, when the downhill detector GD determines that the vehicle's path is on the downhill road, the engine brake detector EB determines that the vehicle is under the engine brake, and the non-contact detector NC determines that the at least one wheel is not contacting the ground, as will be described later in detail. In practice, it is so arranged that the braking force controlling device BC applies the braking force to both of the front wheels FL, FR of the vehicle, when the slip detector SR detects the slip of the at least one of the rear wheels RL, RR, without the braking operation and the accelerating operation performed by a vehicle driver. Or, it may be so arranged that the braking force controlling device BC applies the braking force to the at least one wheel which is not contacting the ground, when the downhill detector GD determines that the vehicle's path is on the downhill road, the engine brake detector EB determines that the vehicle is under the engine brake, and the non-contact detector NC determines that the at least one wheel is not contacting the ground, as will be described later in detail. For example, the braking force controlling device BC may be adapted to apply the braking force to both of the front wheels of the vehicle, when the downhill detector GD determines that the vehicle's path is on the downhill road, the engine brake detector EB determines that the vehicle is under the engine brake, and the slip detector SR detects the slip of the at least one wheel. The slip detector SR may be arranged to calculate a slip rate of each of the wheels on the basis of the wheel speeds and the estimated vehicle speed, and detect the slip of the at least one wheel on the basis of the slip rate. In this case, it may be so arranged that when the braking force is applied to the at least one wheel until the at least one wheel is substantially locked, and thereafter the braking force applied to the at least one wheel is reduced, if its slip rate is smaller than a predetermined rate, the braking force controlling device BC will terminate applying the braking force to the at least one wheel. Also, it may so arranged that when the braking force is applied to the at least one wheel until the at least one wheel is substantially locked, and thereafter the braking force applied to the at least one wheel is reduced, if its slip rate is greater than the predetermined rate, the braking force controlling device BC will continue to apply the braking force to the at least one wheel. In other words, when the braking force is applied to the at least one wheel until it is substantially locked, and then the braking force is reduced, if its slip rate is greater than the predetermined rate, it may be determined that the wheel to be controlled is rotating freely, so that the condition of the wheel to be controlled will be properly monitored.

The downhill detector GD may include a tilt detector GR, as indicated by broken lines in FIG. 1, which is adapted to detect a tilt angle of the vehicle, and it may be adapted to determine that the vehicle's path is on the downhill road, when the tilt detector GR detects the tilt angle tilted more than a predetermined angle, provided that the moving direction of the vehicle corresponds to the downward direction of the downhill road, for a predetermined period of time. In addition, it may be added as a requisite that the estimated vehicle speed exceeds a predetermined speed. Furthermore, an acceleration detector (not shown) such as a so-called G sensor may be provided, and it may be determined that the road in the vehicle's path goes downhill, when a difference between the acceleration which is detected by the acceleration detector, and the acceleration which is calculated from the estimated vehicle speed, exceeds a predetermined level.

The engine brake detector EB may include a gear position detector GP, as indicated by broken lines in FIG. 1, which is adapted to detect a gear position of the transmission GS, and it may determine that the vehicle is under the engine brake, at least when the gear position detector GP detects a predetermined gear position for providing a relatively low vehicle speed, and when the downhill detector GD determines that the vehicle's path is on the downhill road. In addition, it may be added as a requisite that an increasing rate of the acceleration of the vehicle exceeds a predetermined rate. Furthermore, it may be added as another requisite that an accelerating operation of the vehicle is released, which can be determined by an idle switch signal of a throttle sensor as will be described later. The braking force controlling device BC may include wheel brake cylinders operatively mounted on the four wheels, respectively, a pressure generating apparatus which supplies hydraulic braking pressure to each of the wheel brake cylinders at least in response to depression of a brake pedal, and a pressure control apparatus which is disposed between the pressure generating apparatus and the wheel brake cylinders to control the hydraulic braking pressure in the wheel brake cylinder to be controlled, as will be described in detail hereinafter.

Figure 2:
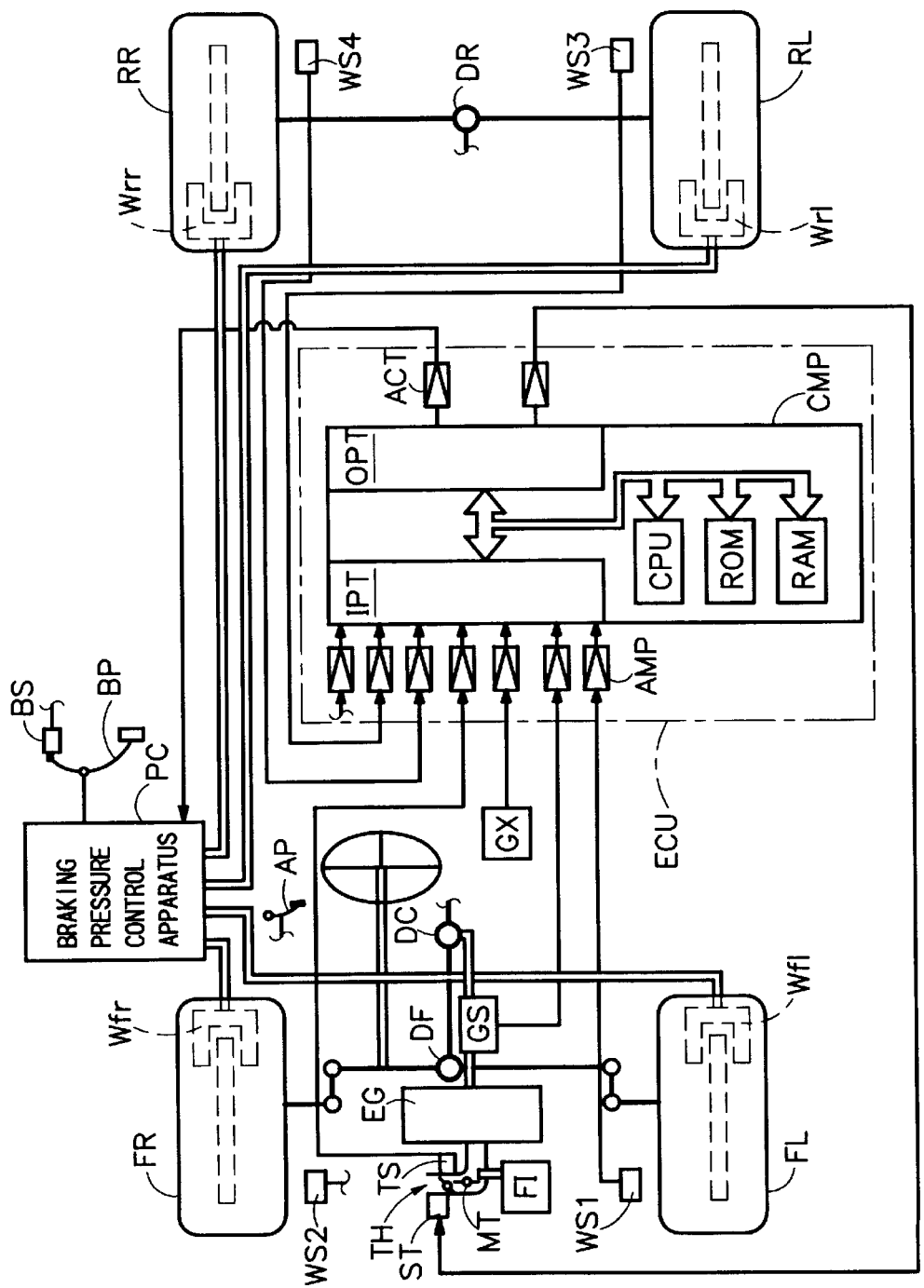
FIG. 2 is a schematic block diagram of a vehicle including the braking control system of the above embodiment.

More specifically, the details of the embodiments disclosed in FIG. 1 are illustrated in FIGS. 2 to 19. As shown in FIG. 2, the engine EG is provided with a fuel injection apparatus FI and a throttle control apparatus TH which is arranged to control a main throttle opening of a main throttle valve MT in response to operation of an accelerator pedal AP. In FIG. 2, the throttle control apparatus TH has a sub-throttle valve ST, which is actuated in response to an output signal of an electronic controller ECU to control a sub-throttle opening. Also, the fuel injection apparatus FI is actuated in response to an output signal of the electronic controller ECU to control the fuel injected into the engine EG. The wheel FL designates the wheel placed at the front left side as viewed from the position of a driver's seat, the wheel FR designates the wheel at the front right side, the wheel RL designates the wheel at the rear left side, and the wheel RR designates the wheel at the rear right side.

Figure 3:
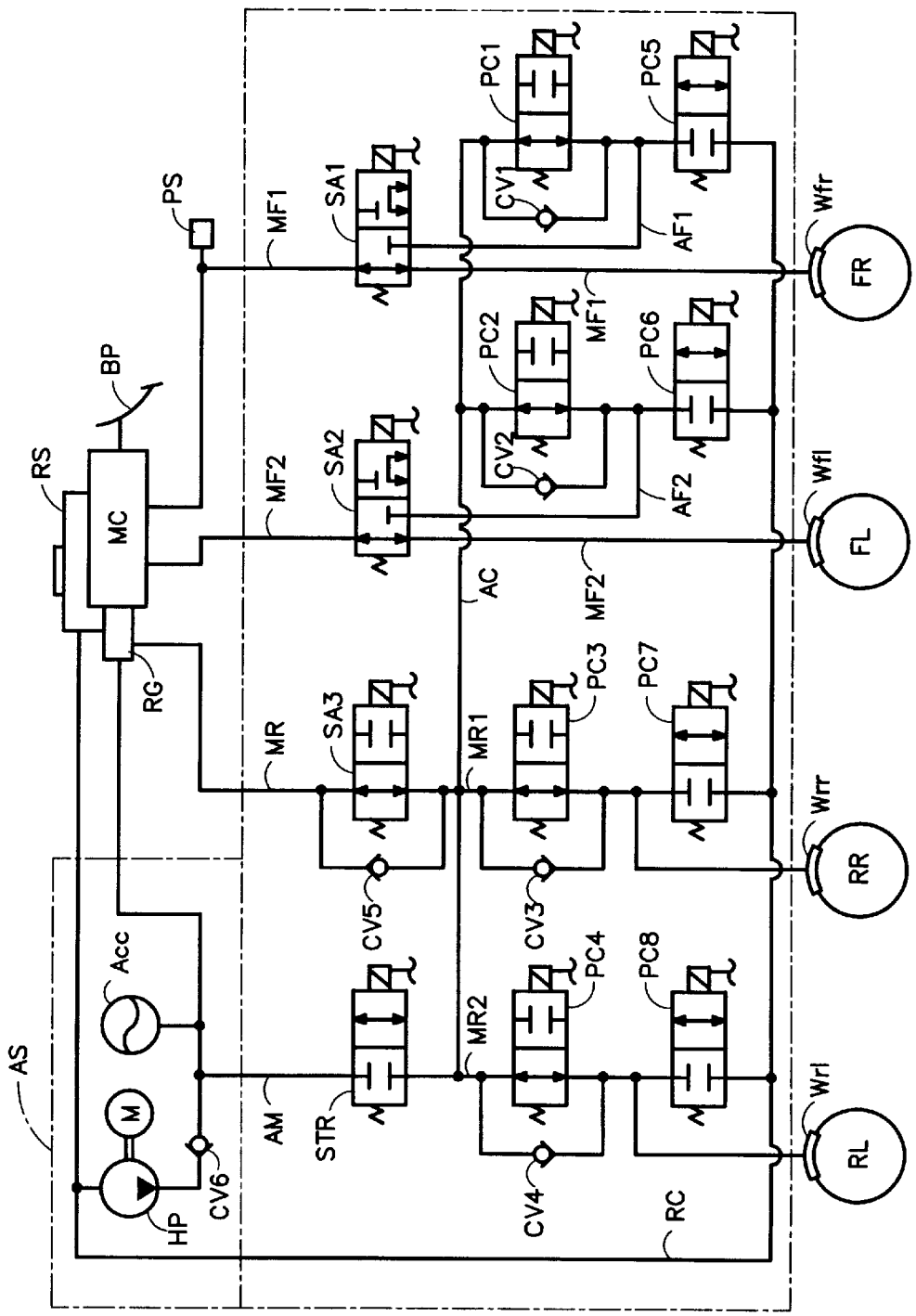
FIG. 3 is a block diagram illustrating an embodiment of a pressure control apparatus for use in the above embodiment.

With respect to a braking system according to the present embodiment, the wheel brake cylinders Wfl, Wfr, Wrl, Wrr are operatively mounted on the front wheels FL, FR and rear wheels RL, RR of the vehicle, respectively, and fluidly connected to a hydraulic braking pressure control apparatus PC. The pressure control apparatus PC in the present embodiment may be arranged as illustrated in FIG. 3 which will be explained later in detail. According to the present embodiment, as shown in FIG. 2, the engine EG is operatively connected with the front wheels FL, FR through the front differential gear DF, and connected with the rear wheels RL, RR through the transmission GS, center differential gear DC and rear differential gear DR to provide the four-wheel drive system. Therefore, all of the wheels FL, FR, RL, RR are driven wheels. The transmission GS has plural gear positions which are shifted by a shift lever (not shown). Among them, a gear position for selecting a four-wheel drive gear of a low speed range is named "L4". This gear position of a low speed range L4 was connected to the center differential locking mechanism in the prior apparatus. According to the present invention, it is not necessary to install the center differential locking mechanism. If it was installed, it would be unnecessary to connect the gear position L4 to the center differential locking mechanism.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed and turns off when the brake pedal BP is released, an acceleration sensor (not shown) for detecting a vehicle acceleration, and the like. These are electrically connected to the electronic controller ECU, which also receives from a throttle sensor TS an idle switch signal of ON/OFF signal indicative of an idling range or a driving range, and throttle opening angle signals of the main throttle valve MT and sub-throttle valve ST. Thus, the operation of the accelerator pedal AP can be detected on the basis of the idle switch signal output from the throttle sensor TS.

There is provided a tilt sensor GX, which detects a tilt angle of the vehicle to serve as the tilt detection means according to the present invention, and which is electrically connected to the electronic controller ECU. The tilt sensor GX is provided with a weight which is installed to swing back and forth, and adapted to output a signal (Gx) indicative of a displacement of the weight moved in accordance with the tilt of the vehicle along the longitudinal axis thereof. On the basis of the signal (Gx), a longitudinal tilt angle of the vehicle Gr is calculated by an equation Gr=K·Gx, where "K" is a constant, provided that the vehicle is parked. When the vehicle moves, however, the signal (Gx) varies in response to the acceleration of the vehicle, the tilt angle Gr of the vehicle is calculated in accordance with the following equation:

$$Gr(n)=k \cdot Gr(n-1)+(1-k) \cdot K \cdot (Gx-Gw)$$

where "Gr(n−1)" is the tilt angle obtained in the previous cycle, "k" (0<k<1) is a weighing coefficient. "Gw" is a vehicle acceleration, and the estimated vehicle acceleration DVso may be substituted for it. The tilt angle Gr according to the present invention indicates a positive value when the vehicle goes uphill, whereas it indicates a negative value when the vehicle goes downhill.

The electronic controller ECU is provided with a microcomputer CMP which includes a central processing unit or CPU, a read-only memory or ROM, a random access memory or RAM an input port IPT, and an output port OPT, and the like, as shown in FIG. 2. The signals detected by each of the wheel speed sensors WS1 to WS4, brake switch BS, acceleration sensor (not shown) and etc. are fed to the input port IPT via respective amplification circuits AMP and then to the central processing unit CPU. The control signals are fed from the output port OPT to the throttle control apparatus TH and hydraulic pressure control apparatus PC via the respective driving circuits (represented by ACT in FIG. 2). In the microcomputer CMP, the read-only memory ROM memorizes a program corresponding to flowcharts shown in FIGS. 4 and etc., the central processing unit CPU executes the program while the ignition switch (not shown) is closed, and the random access memory RAM temporarily memorizes variable data needed to execute the program.

FIG. 3 shows the hydraulic braking pressure system, wherein the hydraulic circuits are divided into the front hydraulic circuit and the rear hydraulic circuit to form a front and rear dual circuit system according to the present embodiment. A pressure generator for use in the present embodiment includes a master cylinder MC and a regulator RG, which are activated in response to depression of the brake pedal BP. The regulator RG is connected to an auxiliary pressure source AS, both of which are connected to a low-pressure reservoir RS, to which the master cylinder MC is connected, as well. The auxiliary pressure source AS includes a hydraulic pressure pump HP and an accumulator Acc. The pump HP is driven by an electric motor M to pressurize a brake fluid in the reservoir RS to discharge the pressurized brake fluid, or hydraulic braking pressure through a check valve CV6, into the accumulator Acc to accumulate it therein. The electric motor M starts to operate when the pressure in the accumulator Acc is decreased to be less than a predetermined lower limit, and stops when the pressure in the accumulator Acc is increased to exceed a predetermined upper limit. Accordingly, it is so arranged that a so-called power pressure be properly supplied from the accumulator Acc to the regulator RG. The regulator RG introduces the hydraulic braking pressure discharged from the auxiliary pressure source AS and regulates it to a regulator pressure in proportion to a pilot pressure discharged from the master cylinder MC. The structure of the regulator RG is well known in the art, so that explanation thereof is omitted. A part of the regulator pressure is used for assisting the operation of the master cylinder MC.

In hydraulic pressure passages MF1, MF2 for connecting the master cylinder MC with the front wheel brake cylinders Wfr, Wfl, respectively, disposed are solenoid valves SA1 and SA2 which are connected to solenoid valves PC1, PC5 and solenoid valves PC2, PC6, through passages AF1 and AF2, respectively. In the hydraulic pressure passage MF1 (or MF2), a pressure sensor PS is provided for detecting the hydraulic pressure output from the master cylinder MC. A solenoid valve SA3 is disposed in a passage MR which is provided for connecting the regulator RG to the wheel brake cylinders Wrr, Wrl and so on, and which is divided into passages MR1, MR2, in which solenoid valves PC3, PC7 and solenoid valves PC4, PC8 for use in the control of discharging and draining the brake fluid are disposed. Then, the auxiliary pressure source AS is connected to the downstream side of the solenoid valve SA3 through a passage AM, in which a solenoid valve STR is disposed. The solenoid valve STR is of a two-port two-position solenoid operated valve, which is normally closed and activated to communicate the solenoid valves PC1–PC4 directly with the accumulator Acc.

With respect to the front hydraulic circuit, the solenoid valves SA1 and SA2 are of a three-port two-position sole-noid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, through the passages AF1, AF2, respectively. The solenoid valves PC1 and PC2 are connected with the solenoid valve STR through a passage AC. The solenoid valves PC5 and PC6 are connected to the reservoir RS through a passage RC. In parallel with the solenoid valves PC1 and PC2, check valves CV1 and CV2 are disposed, respectively. The inlet side of the check valve CV1 is connected to the passage AF1 and the inlet side of the check valve CV2 is connected to the passage AF2. The check valve CV1 is provided for allowing the flow of the brake fluid toward the regulator RG and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the regulator RG. The check valve CV2 is provided in the same manner as the check valve CV1.

With respect to the rear hydraulic circuit, the solenoid valve SA3 is of a two-port two-position solenoid operated valve, which is normally opened as shown in FIG. 3, so that the solenoid valves PC3 and PC4 are communicated with the regulator RG. In this case, the solenoid valve STR is placed in its closed position to shut off the communication with the accumulator Acc. When the solenoid valve SA3 is energized, it is placed in its closed position, where both of the solenoid valves PC3 and PC4 are prevented from communicating with the regulator RG, while the solenoid valves PC3 and PC4 (and, solenoid valves PC1 and PC2) are communicated with the accumulator Acc when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl, respectively. The check valves CV3 and CV4 are provided for allowing the flow of the brake fluid toward the solenoid valve SA3 and preventing the reverse flow. Therefore, when the brake pedal BP is released, the hydraulic pressure in each of the wheel brake cylinders Wrr, Wrl is rapidly reduced to the pressure discharged from the regulator RG. Furthermore, the check valve CV5 is disposed in parallel with the solenoid valve SA3 so that the brake fluid may be supplied from the regulator RG to the solenoid valves PC1–PC4 through the check valve CV5 in response to depression of the brake pedal BP, even when the solenoid valve SA3 is placed in its closed position.

The above-described solenoid valves SA1, SA2, SA3, STR, and PC1–PC8 are controlled by the electronic controller ECU to provide various control modes including the traction control mode, as will be described hereinafter. The motor M drives the pump HP, so that the power pressure is accumulated in the accumulator Acc. The solenoid valves are placed in their normal positions as shown in FIG. 3. When the brake pedal BP is depressed, the master cylinder pressure is discharged from the master cylinder MC, and the regulator pressure is discharged from the regulator RG, and supplied to the wheel brake cylinders Wfr-Wrl through the solenoid valves SA1, SA2, SA3 and PC1–PC4.

When the traction control is initiated to start an anti-slip control operation for the wheel FR under the accelerating operation, for example, the solenoid valve SA1 is changed to its second operating position, and the solenoid valves PC3, PC4 connected to the rear wheel brake cylinders Wrr, Wrl and the solenoid valve SA3 are placed in their closed positions, while the solenoid valves STR and PC1 are placed in their open positions. As a result, the power pressure accumulated in the accumulator ACC is supplied to the wheel brake cylinder Wfr through the solenoid valve STR placed in its open position. Then, if the solenoid valve PC1 is placed in its closed position, the pressure in the wheel brake cylinder Wfr is held. Accordingly, when the solenoid valve PC1 is opened and closed alternately, with the solenoid valve PC5 held in its closed position, the hydraulic braking pressure in the wheel brake cylinder Wfr is increased and held repeatedly like pulses thereby to be increased gradually. If the solenoid valve PC5 is placed in its open position, the wheel brake cylinder Wfr is connected to the reservoir RS through the passage RC, so that the brake fluid in the wheel brake cylinder Wfr is returned to the reservoir RS. Thus, with the solenoid valves PC1 and PC5 opened or closed alternately in response to the slip state of the wheel FR under the accelerating operation, one of the pressure modes including pressure increase, pressure decrease and hold modes is performed with respect to the wheel brake cylinder Wfr. Whereby, the braking force is applied to the wheel FR to limit its rotating force, so that the accelerating slip is effectively prevented to perform the traction control properly. Likewise, the anti-slip control is performed with respect to the wheel FL. Furthermore, the braking control for the wheels FR, FL to be controlled according to the present embodiment, can be performed with the solenoid valves PC1 and etc. opened or closed alternately, as will be described later in detail.

On the other hand, during the braking operation, when the wheel FR tends to be locked for example, and the anti-skid control is initiated, the solenoid valve SA1 is changed to its second operating position, and the solenoid valve PC1 is placed in its closed position, while the solenoid valve PC5 is placed in its open position. As a result, the brake fluid in the wheel brake cylinder Wfr is drained into the reservoir RS to reduce the pressure in the wheel brake cylinder Wfr. When a gradual increase mode is selected for the wheel brake cylinder Wfr, the solenoid valve PC5 is placed in its closed position and the solenoid valve PC1 is in its open position, so that the regulator pressure is supplied from the regulator RG through the solenoid SA3 and the passage AC, and then the solenoid valve PC1 in its open position and the solenoid valve SA1 in its second position. Then, the solenoid valve PC1 is opened and closed alternately, so that the pressure in the wheel brake cylinder Wfr is increased and held repeatedly like pulses thereby to be increased gradually. When a rapid increase mode is selected for the wheel brake cylinder Wfr, the solenoid valves PC1, PC5 are placed in the normal positions as shown in FIG. 3, and then the solenoid valve SA1 is placed in its first position, so that the master cylinder pressure is supplied from the master cylinder MC. With respect to the rear wheels RR, RL, the solenoid valves PC3, PC4, PC7 and PC8 are operated to perform the anti-skid control in the same manner as described above.

Figure 4:
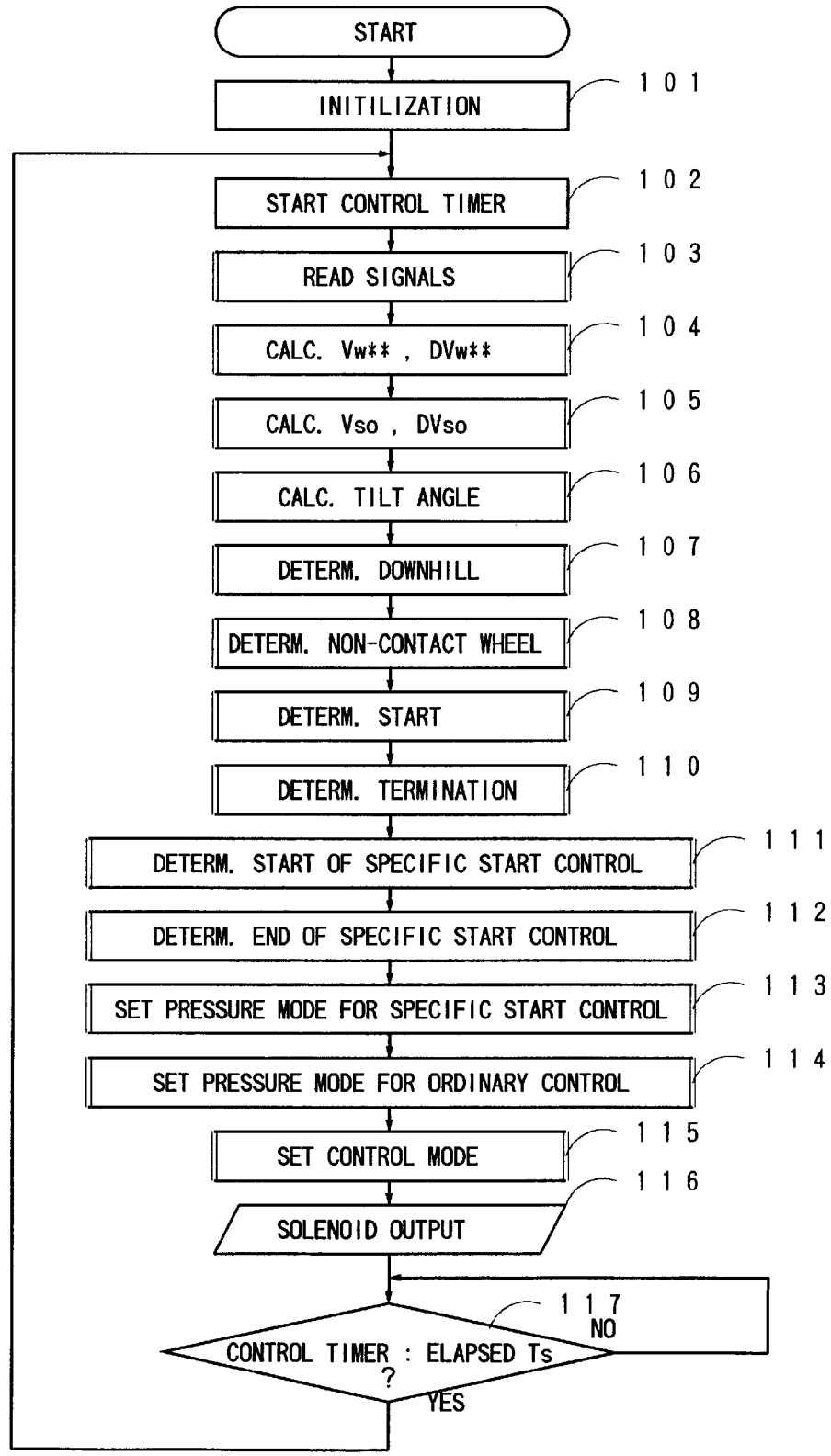
FIG. 4 is a flowchart showing a main routine of the braking control according to the above embodiment of the present invention.

According to the present embodiment as constituted above, a program routine for performing the braking control according to the present embodiment, traction control, antiskid control and etc. is executed by the electronic controller ECU. FIG. 4 shows a flowchart for the braking control when the vehicle goes downhill with an engine brake operated. Its program routine starts when an ignition switch (not shown) is turned on. At Step 101, an initialization of the system at Step 101 is made to clear various data. Then, a control timer is cleared at Step 102 to start counting an elapsed time. And, the signals detected by the wheel speed sensors WS1–WS4, the gear position signal of the transmission GS and the signal detected by the tilt sensor GX are read by the microcomputer CMP at Step 103.

Then, the program proceeds to Step 104 where the wheel speed Vw ( represents one of the wheels FL, FR, RL, RR) of each wheel is calculated on the basis of the signals detected by the wheel speed sensors WS1–WS4, and differentiated to provide the wheel acceleration DVw. And, at Step 105, an estimated vehicle speed Vso is calculated on the basis of the wheel speeds Vw of four wheels. When the estimated vehicle speed in the previous cycle is indicated by "Vso(n−1)", and the estimated vehicle speed in the present cycle is indicated by "Vso(n)", the following equation is provided:

$$Vso(n)=MED[Vso(n-1)\cdot\alpha up\cdot t, MAX(Vw^{**}), Vso(n-1)\cdot\alpha dw\cdot t]$$

where "MED" is a function for calculating an intermediate value, while "MAX" is a function for calculating a maximum value. "t" indicates a calculating period, "αup" is a constant acceleration, and "αdw" is a constant deceleration. These are used for limiting a gradient of the maximum value MAX(Vw) with reference to the estimated vehicle speed Vso(n−1) in the previous cycle. While Vw indicates the wheel speed of each wheel , only wheel speeds of the wheels which are not the non-contact wheels (i.e., the contact wheels), and which are not to be controlled, are used for calculating the maximum value MAX(Vw). According to the present embodiment, therefore, the wheel speed of the wheel which is not the non-contact wheel (i.e., either the wheel RR or RL), out of the rear wheels RR, RL which are not to be controlled, is used as the estimated vehicle speed Vso. Then, the estimated acceleration DVso is calculated from the difference [Vso(n)− Vso(n−1)] between the estimated vehicle speed Vso(n) in the present cycle and the estimated vehicle speed Vso(n−1) in the previous cycle. In stead, the estimated acceleration DVso can be obtained by differentiating the estimated vehicle speed Vso.

Then, the program proceeds to Step 106, where the tilt angle Gr is calculated on the basis of the signal output from the tilt sensor GX. In this respect, the tilt angle Gr according to the present embodiment indicates a positive value when the vehicle goes uphill, while it indicates a negative value when the vehicle goes downhill. Then, at Step 107, on the basis of the estimated vehicle speed Vso and the tilt angle Gr, it is determined whether the road in the vehicle's path is a downhill road, which will be explained later in detail with reference to FIG. 5. Further, the program proceeds to Step 108, where the slip of the wheel is determined, so that it is determined whether the non-contact wheel exists, as will be explained later in detail with reference to FIG. 6.

The program further proceeds to step 109, where it is determined whether the braking control can be initiated with respect to the wheel to be controlled when the engine brake is operated (the front wheels FR, FL in the present embodiment), i.e., the determination of starting the braking control is made, as will be explained later in detail with reference to FIG. 7. Next, a condition for terminating the braking control is determined at Step 110, as will be explained later in detail with reference to FIG. 8. Furthermore, a condition for initiating a specific control for starting the braking control (hereinafter, referred to as specific start control) is determined at Step 111, and a condition for ending the specific start control is determined at Step 112. Then, a pressure mode for the specific start control is set at Step 113, as will be described later in detail with reference to FIGS. 9, 10 and 11. And, a pressure mode for the ordinary control is set at Step 114, as will be explained later in detail with reference to FIG. 12, then a control mode is set at Step 115, as will be explained later in detail with reference to FIG. 13. Then, a signal for controlling a solenoid is output at Step 116 in accordance with the pressure mode thereby to control the wheel brake cylinder pressure. Lastly, the program waits at Step 117 until the control timer which started counting a time at Step 102 will count a predetermined period of time (e.g., 10 ms), and thereafter the program will return to Step 102.

Figure 5:
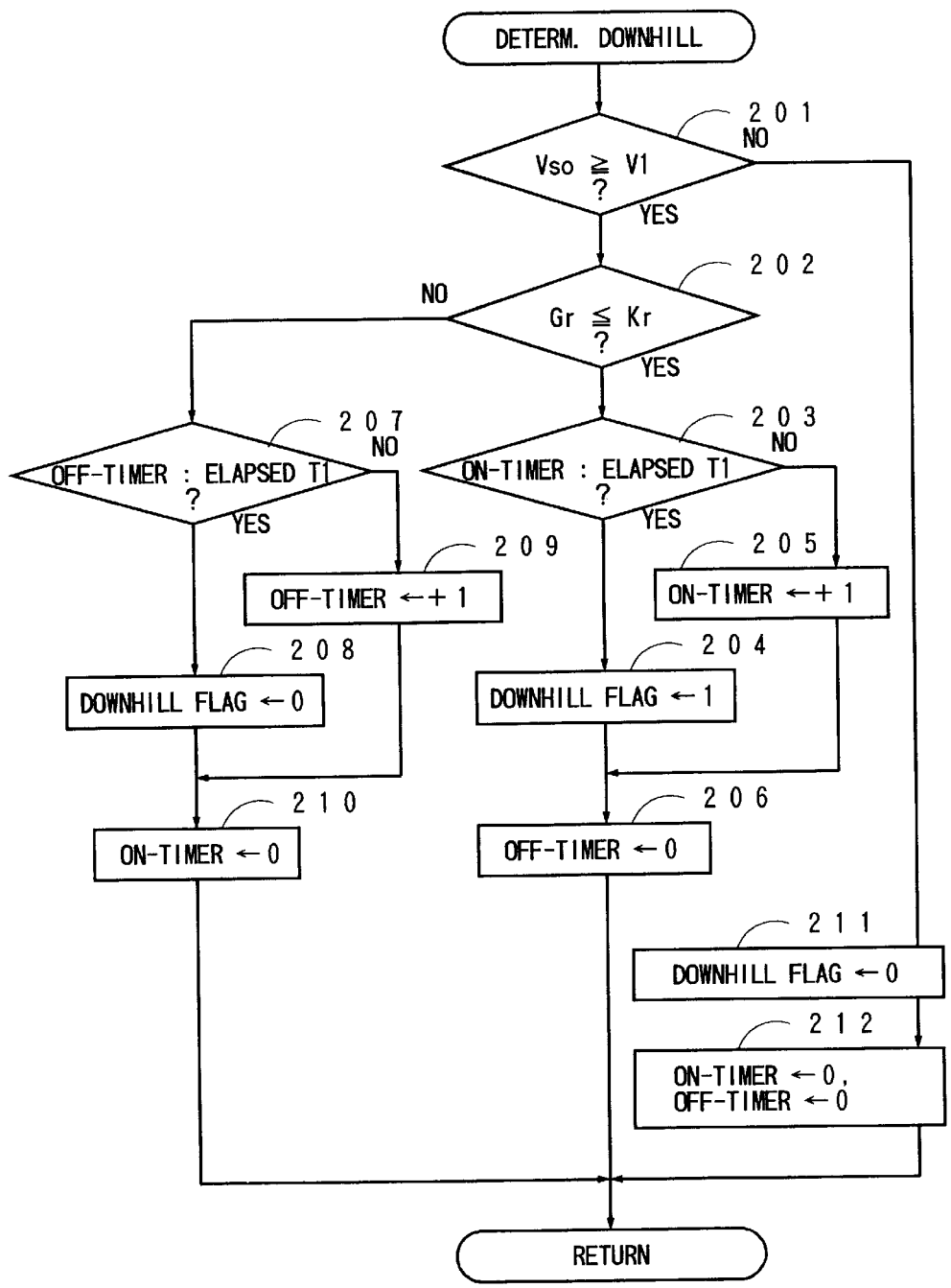
FIG. 5 is a flowchart showing a sub-routine for determining a downhill in the braking control performed in the flowchart as shown in FIG. 4.

FIG. 5 shows the determination of the downhill executed at Step 107 in FIG. 4. At the outset, it is determined at Step 201 whether the estimated vehicle speed Vso is equal to or higher than a predetermined speed V1 (e.g., 7 km/h). If the result is affirmative, the program proceeds to Step 202, where the tilt angle Gr is compared with a predetermined angle Kr (e.g., −15 degree). If the tilt angle Gr is equal to or smaller than the predetermined angle Kr, i.e., if the road in the vehicle's path is the downhill road which is tilted more than the absolute value |Kr| of the predetermined angle Kr with the moving direction of the vehicle directed downward, the program proceeds to step 203, where it is determined whether an ON timer has exceeded the predetermined time T1 (e.g., 1 sec.). If the ON timer has exceeded a predetermined time T1 (1 sec.) with the tilt angle Gr held smaller than the predetermined angle Kr, the program proceeds to Step 204, where a downhill flag is set to be "1". Otherwise, the ON timer is incremented at Step 205. Then, after an OFF timer is cleared at Step 206, the program returns to the main routine.

If it is determined that the tilt angle Gr exceeds the predetermined angle Kr at Step 202, the program proceeds to Step 207, where it is determined whether the OFF timer has exceeded the predetermined time T1. If the OFF timer has exceeded the predetermined time T1, the program proceeds to Step 208, where the downhill flag is reset to be "0". If the OFF timer has not exceeded the predetermined time T1, the OFF timer is incremented at Step 209. Then, after the ON timer is cleared at Step 210, the program returns to the main routine. If it is determined that the estimated vehicle speed Vso is lower than the predetermined speed V1, the program proceeds to Step 211, where the downhill flag is reset, and further proceeds to Step 212, where the ON timer and OFF timer are cleared, then returns to the main routine. Accordingly, if the vehicle travels more than the predetermined time T1 in such a condition that the tilt angle Gr is equal to or smaller than the predetermined angle Kr, i.e., in the case where the vehicle goes downhill with the moving direction of the vehicle directed downward, the downhill flag is set. On the other hand, if the vehicle travels more than the predetermined time T1 in such a condition that the tilt angle Gr exceeds the predetermined angle Kr, the downhill flag is reset. In this case, the ON timer and OFF timer constitute a delay timer, so that an influence of a noise in the tilt sensor GX can be avoided.

Figure 6:
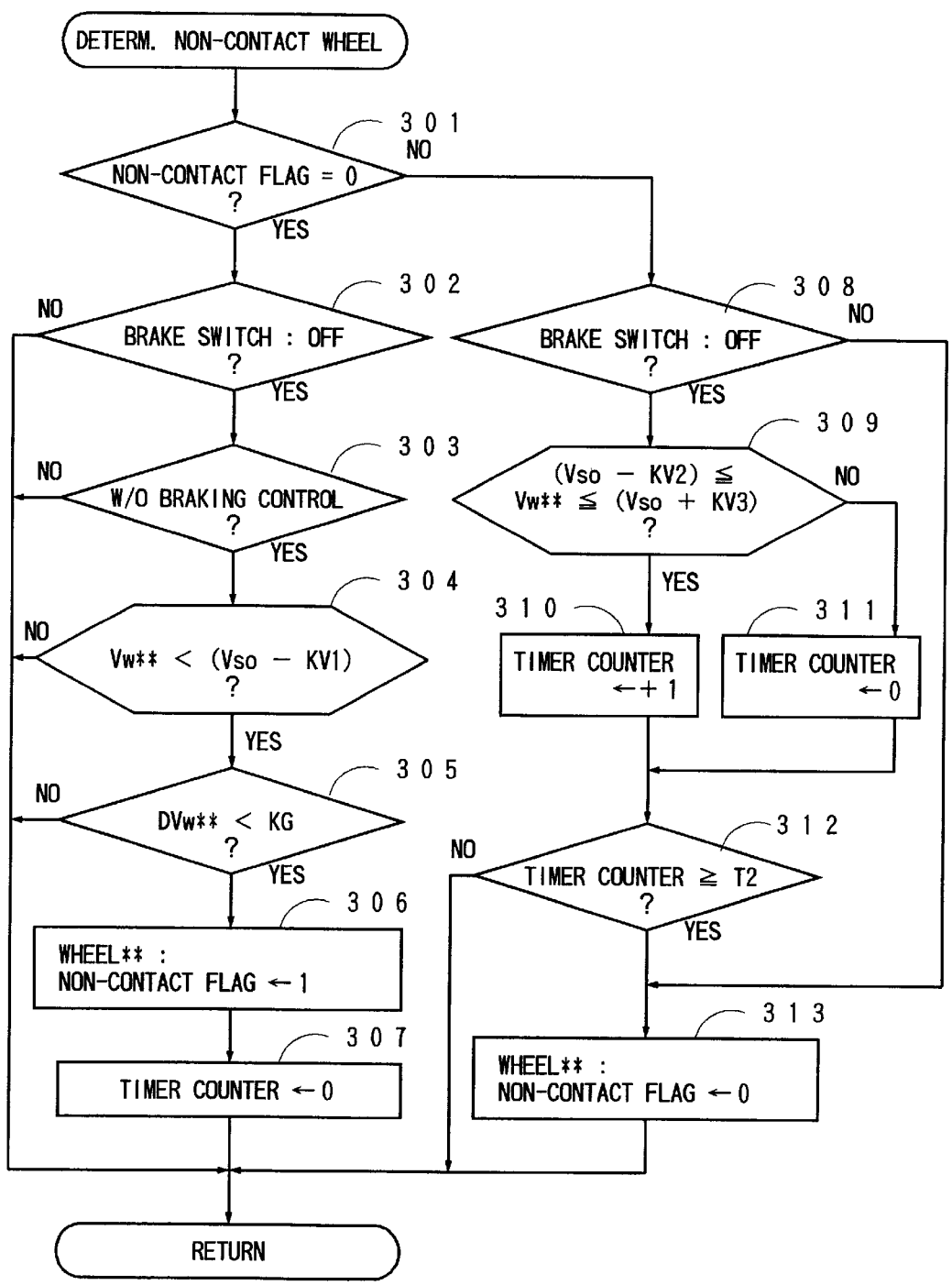
FIG. 6 is a flowchart showing a sub-routine for determining a non-contact wheel in the braking control performed in the flowchart as shown in FIG. 4.

Next, the determination of the non-contact wheel executed at Step 108 in FIG. 4 will be explained with reference to FIG. 6. The determination of the non-contact may be performed by detecting a slip of each wheel according to the present invention. In this embodiment, however, only the slip rates of the rear wheels RR, RL are detected. At the outset, it is determined whether a non-contact flag has been set with respect to the wheel RR or RL, at Step 301. If the non-contact flag has not been set, the program proceeds to Steps 302–305, where the slip of the wheel RR or RL is determined. In the case where the wheel speed is rapidly reduced when no breaking operation is made, it is determined that a slip is occurring due to a freely rotating non-contact wheel, without any relationship with the anti-skid control or the like. Referring to FIG. 6, it is determined at Step 302 if the brake switch BS is off. If the brake pedal BP has not been depressed, so that the brake switch BS is off, the program proceeds to Step 303, where it is determined whether the braking control to the wheel to be controlled is being performed. If the result is negative, the program proceeds to Step 304.

At Step 304, the wheel speed Vw is compared with a reference speed (Vso−KV1). If it is lower than the reference speed (Vso−KV1), the program further proceeds to Step 305, where the wheel acceleration DVw is compared with a reference acceleration KG. If the wheel acceleration DVw is lower than the reference acceleration KG, it is determined that the wheel  (RR or RL in the present embodiment) is slipping, so that it corresponds to the non-contact wheel, for which the non-contact flag is set to be "1" at Step 306. Then, a timer counter, which will be described later, is cleared to be zero, and the program returns to the main routine. The "Vso" in the reference speed (Vso−KV1) is the estimated vehicle speed as described before, "KV1" is a constant value. In the case where any one of the conditions defined in Steps 302–305 is not satisfied, the program returns to the main routine, as it is.

If it is determined that the non-contact flag has been set at Step 301, the program proceeds to Steps 308, where it is determined whether the brake switch BS is off. If the brake pedal BP is depressed, so that the brake switch BS is on, the program proceeds to Steps 309–312, where it is determined whether the wheel (RR or RL) is contacting the ground, so that the wheel speed has been recovered. In the case where such a condition that the wheel speed Vw is between the reference speed (Vso−KV2) and the reference speed (Vso+KV3) lasted for a predetermined time T2, then it is determined that the slip condition has been ended, so that the non-contact flag for the wheel (RR or RL) is reset to be zero. The value "KV2" is constant and corresponds to the second predetermined value according to the present invention, so that the reference speed (Vso−KV2) corresponds to the second threshold level according to the present invention. The value "KV3" is constant and corresponds to the third predetermined value according to the present invention, so that the reference speed (Vso+KV3) corresponds to the third threshold level according to the present invention. Accordingly, if it is determined at Step 309 that the wheel speed Vw is out of the zone between the reference speed (Vso−KV2) and the reference speed (Vso+KV3), the program proceed to Step 311, where the timer counter is cleared to be zero, and then proceeds to Step 312. If the wheel speed Vw is between the reference speed (Vso−KV2) and the reference speed (Vso+KV3), the program proceed to Step 310, where the timer counter is incremented (+1), and then proceeds to Step 312. When the timer counter counts a time longer than the predetermined time T2, the non-contact flag is reset to be zero. The reason why the condition that the wheel speed Vw is between the reference speed (Vso−KV2) and the reference speed (Vso+KV3) lasted for the predetermined time T2, is used for determining that the wheel speed has been recovered, will be described later with reference to FIG. 14.

Figure 7:
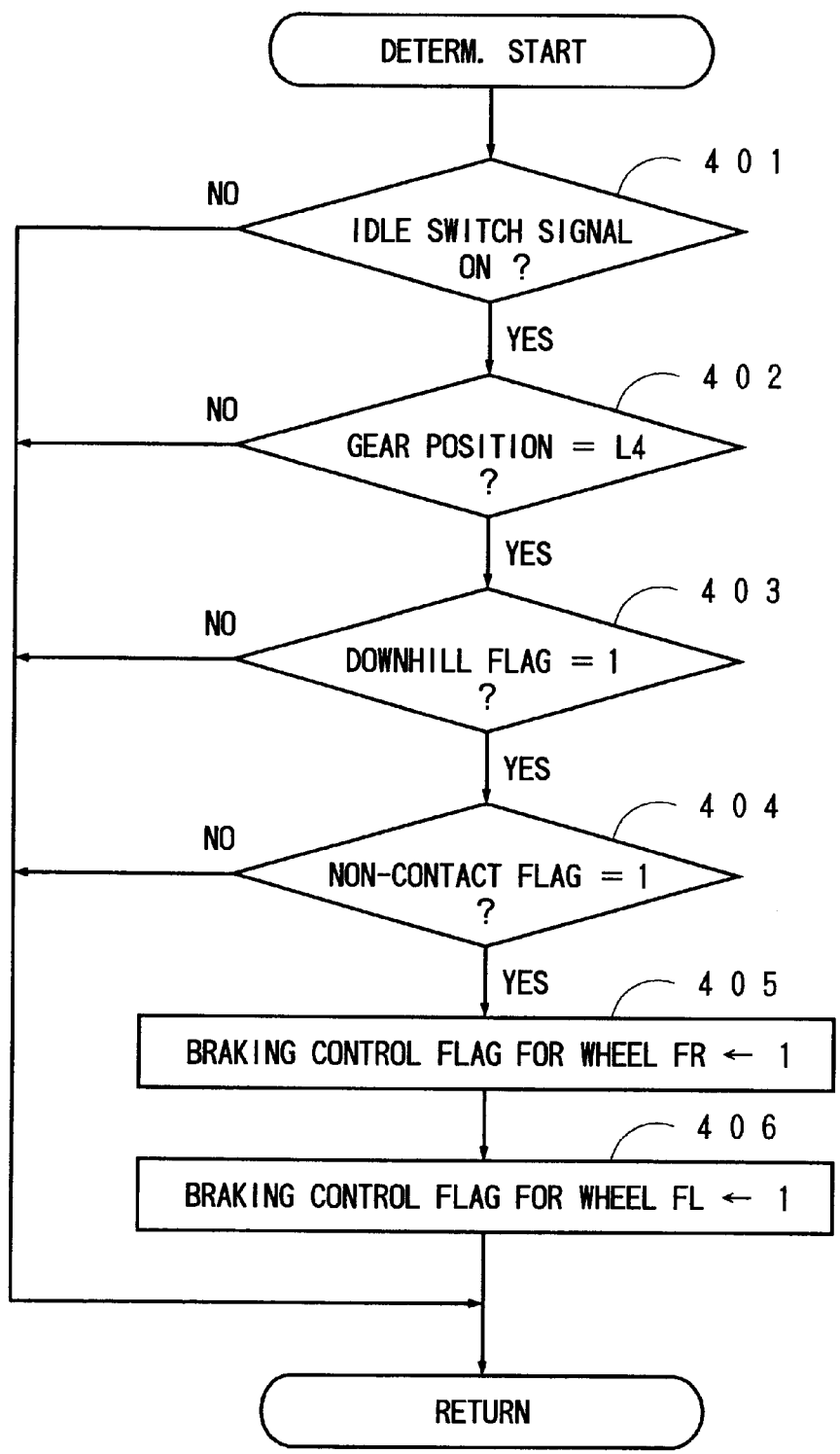
FIG. 7 is a flowchart showing a sub-routine for determining start of the braking control performed in the flowchart as shown in FIG. 4.

FIG. 7 shows the determination of starting the braking control executed at Step 109 in FIG. 4. First, it is determined at Step 401 whether the idle switch signal of the throttle sensor TS is on or off. If it is determined the idle switch signal is on, i.e., if the accelerator pedal AP is not operated, the program proceeds to Step 402, where it is determined whether the transmission GS is shifted to the low range gear position L4, or not. If the result is affirmative, the program proceeds to Step 403, where it is determined whether the downhill flag is set, or not. If the downhill flag is set, the program further proceeds to Step 404, where it is determined whether the non-contact flag is set, or not. If the non-contact flag is set, the program proceeds to Step 405. According to the present embodiment, therefore, when all of the conditions defined in Steps 401–404 are satisfied, it is determined that the vehicle is under the engine brake. Then, the program proceeds to Steps 405, 406, where the braking control flags are set with respect to both of the wheels FR, FL. When the determination of the engine brake is made, some of the above conditions may be omitted, or other conditions may be added. In the case where any one of the conditions defined in Steps 401–404 are not satisfied, the program returns to the main routine as it is, so that the braking control for the wheels to be controlled (i.e., the wheels FR, FL in this embodiment) under the engine brake will not be performed.

Figure 8:
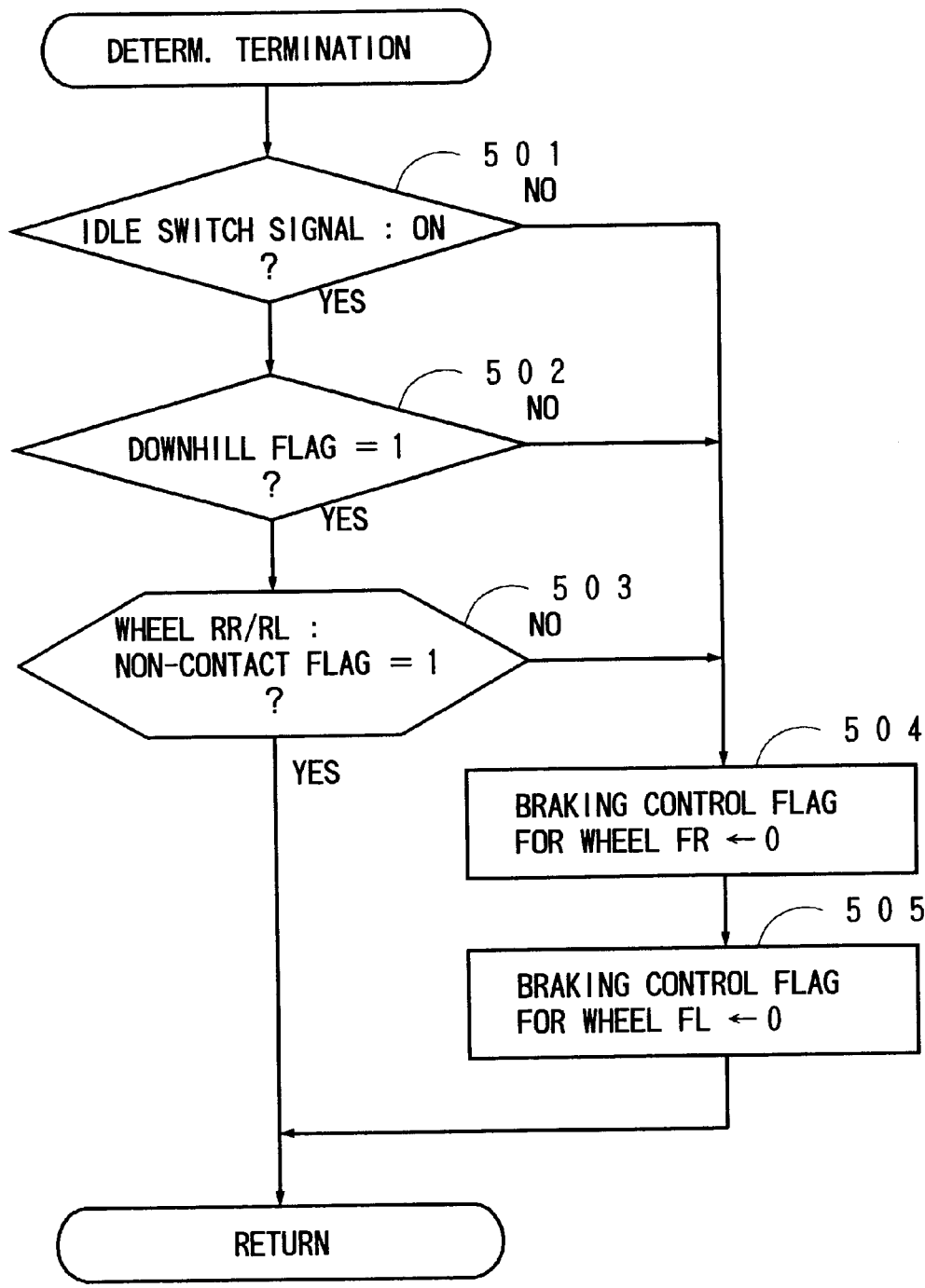
FIG. 8 is a flowchart showing a sub-routine for determining termination of the braking control performed in the flowchart as shown in FIG. 4.

FIG. 8 shows the determination of terminating the braking control executed at Step 110 in FIG. 4. It is determined at Step 501 whether the idle switch signal of the throttle sensor TS is on or off. If the idle switch signal is on, the program proceeds to Step 502, where it is determined whether the downhill flag is set. When the downhill flag is set, the program proceeds to Step 503, where it is determined whether the non-contact flag is set for either the wheel RR or RL. If the non-contact flag is set, the program returns to the main routine, to maintain the braking control for the wheels FR, FL. In the case where any one of the conditions defined in Steps 501–503 are not satisfied, it is determined that the braking control for the wheels FR, FL is to be terminated, so that the program proceeds to Steps 504, 505, where the braking control flags for the wheels FR, FL are reset to be zero, and the program returns to the main routine.

Figure 9:
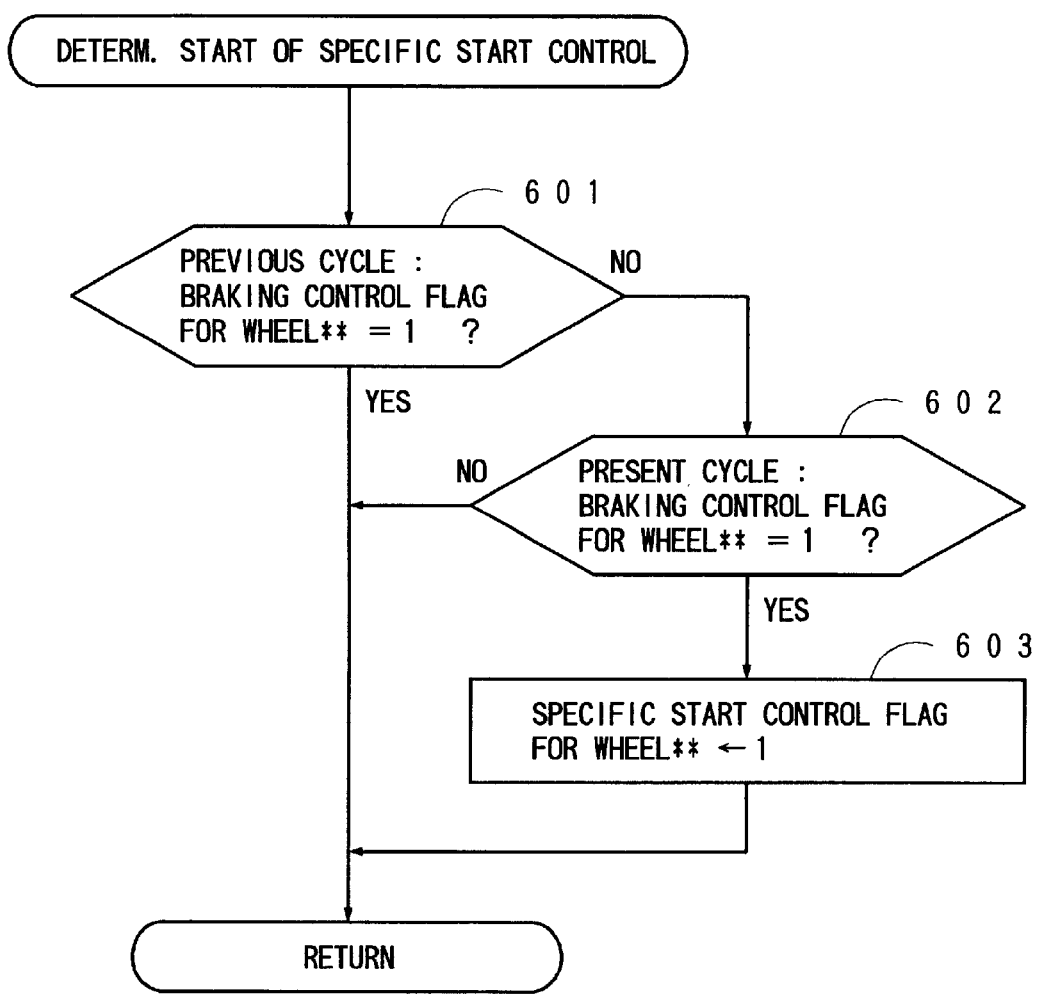
FIG. 9 is a flowchart showing a sub-routine for determining start of a specific start control in the braking control performed in the flowchart as shown in FIG. 4.

FIG. 9 shows the determination of starting the specific start control executed at Step 111 in FIG. 4. At Step 601, the braking control flag for a wheel  in the previous cycle is determined. The wheels to be controlled in FIGS. 9–13 are the front wheels FR, FL according to the present embodiment, they are not limited any one of them, so that they are identified by the wheel  herein. If it is determined at Step 601 that the braking control flag was not set for the wheel  in the previous cycle, the program proceeds to Step 602, where the state of the braking control flag in the present cycle is determined. If it is determined that the braking control flag, which was not set in the previous cycle, is set in the present cycle, it means that it is immediately after the braking control started. Therefore, the program proceeds to Step 603, where a specific start control flag for the wheel  is set. If it is determined that the braking control flag was set in the previous cycle, or if it is determined that the braking control flag has not been set in the present cycle, then the program returns to the main routine.

Figure 10:
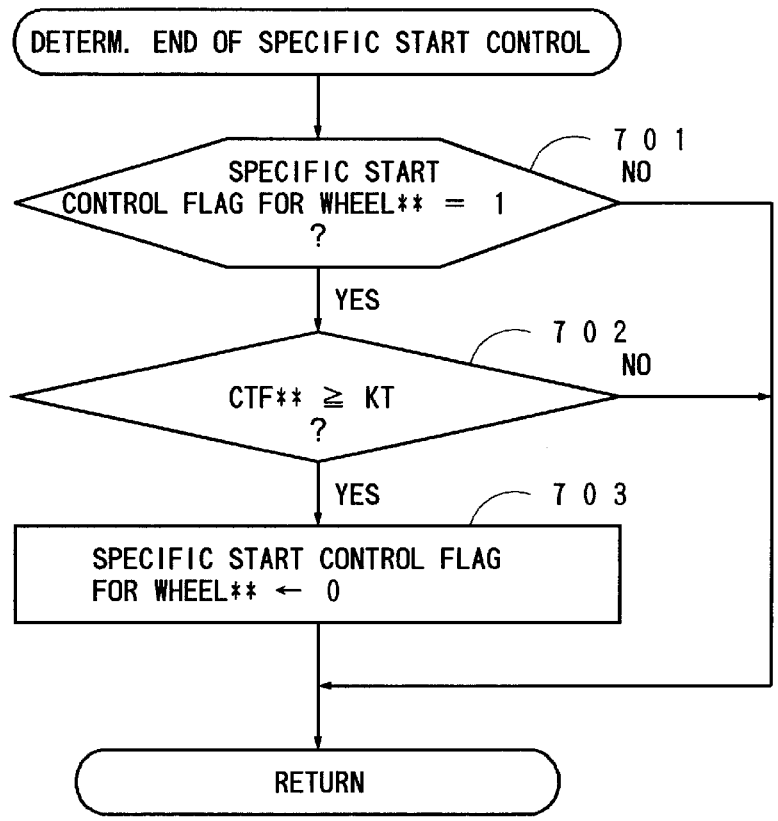
FIG. 10 is a flowchart showing a sub-routine for determining termination of the specific start control in the braking control performed in the flowchart as shown in FIG. 4.

FIG. 10 shows the determination of terminating the specific start control executed at Step 112 in FIG. 4. At Step 701, it is determined whether a specific start control flag for one of the wheels  is set, or not. If the flag has not been set, the program returns to the main routine. If the flag is set, the program proceeds to Step 702, where a specific start control counter CTF for the wheel  is compared with a predetermined time KT. If it is determined that the specific start control counter CTF has counted the predetermined time KT, the program proceeds to Step 703, where the specific start control flag for the wheel  is reset to be zero. If it is determined at Step 701 that the specific start control flag for the wheel  is reset, or if it is determined at Step 702 that the specific start control counter CTF** has not counted the predetermined time KT, the program returns to the main routine.

Figure 11:
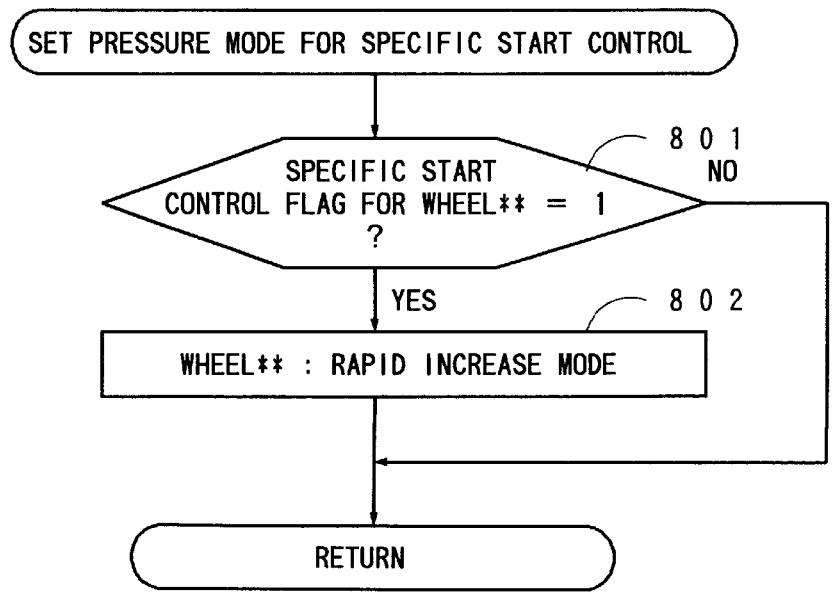
FIG. 11 is a flowchart showing a sub-routine for setting pressure modes for the specific start control in the braking control performed in the flowchart as shown in FIG. 4.
Figure 12:
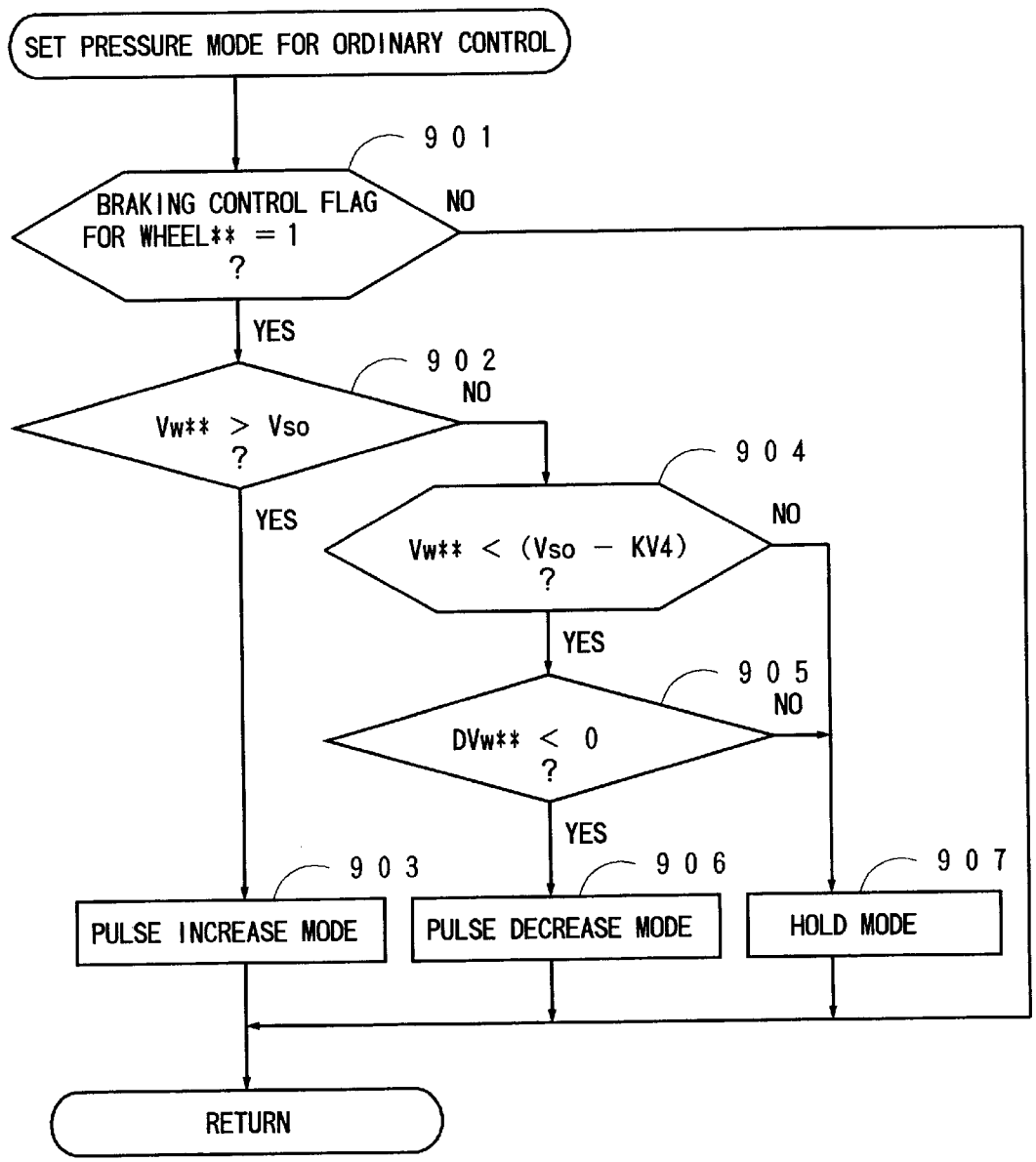
FIG. 12 is a flowchart showing a sub-routine for setting pressure modes for an ordinary control in the braking control performed in the flowchart as shown in FIG. 4.

Referring to FIG. 11, the routine for setting the pressure mode for the specific start control executed at Step 113 in FIG. 4, is initiated by determining the state of the specific start control flag for the wheel  at Step 801. If the specific start control flag for the wheel  is set, the program proceeds to Step 802, where the pressure mode for the wheel  (each of the front wheels FR, FL in the present embodiment) is set to the rapid increase mode. If the specific start control flag is not set for the wheel , the program returns to the main routine. Referring to FIG. 12, the routine for setting the pressure mode for the ordinary control executed at Step 114 in FIG. 4, is initiated by determining the state of the braking control flag for the wheel  at Step 901. if the braking control flag has not been set for the wheel , the program returns to the main routine. If the braking control flag for the wheel  has been set, the program proceeds to Step 902 and other Steps, where the pressure mode for the wheel  (the front wheels FR, FL in the present embodiment) is set to a rapid increase mode, a pulse increase mode, or a hold mode. At Step 902, the wheel speed Vw is compared with the estimated vehicle speed Vso. When the wheel speed Vw exceeds the estimated vehicle speed Vso, the program proceeds to Step 903, where the pulse increase mode is set. If the wheel speed Vw is equal to or lower than the estimated vehicle speed Vso, the program further proceeds to Step 904, where the wheel speed Vw is compared with a reference speed (Vso–KV4), wherein "KV4" is a constant value. If the wheel speed Vw is lower than the reference speed (Vso–KV4), the program further proceeds to Step 905, where it is determined whether the wheel acceleration DVw is a positive value or a negative value. If it is the negative value, then the pulse decrease mode is set at Step 906. If the wheel acceleration DVw is zero or the positive value, or if the the wheel speed Vw is equal to or higher than the reference speed (Vso–KV4), the hold mode is set at Step 907.

Figure 13:
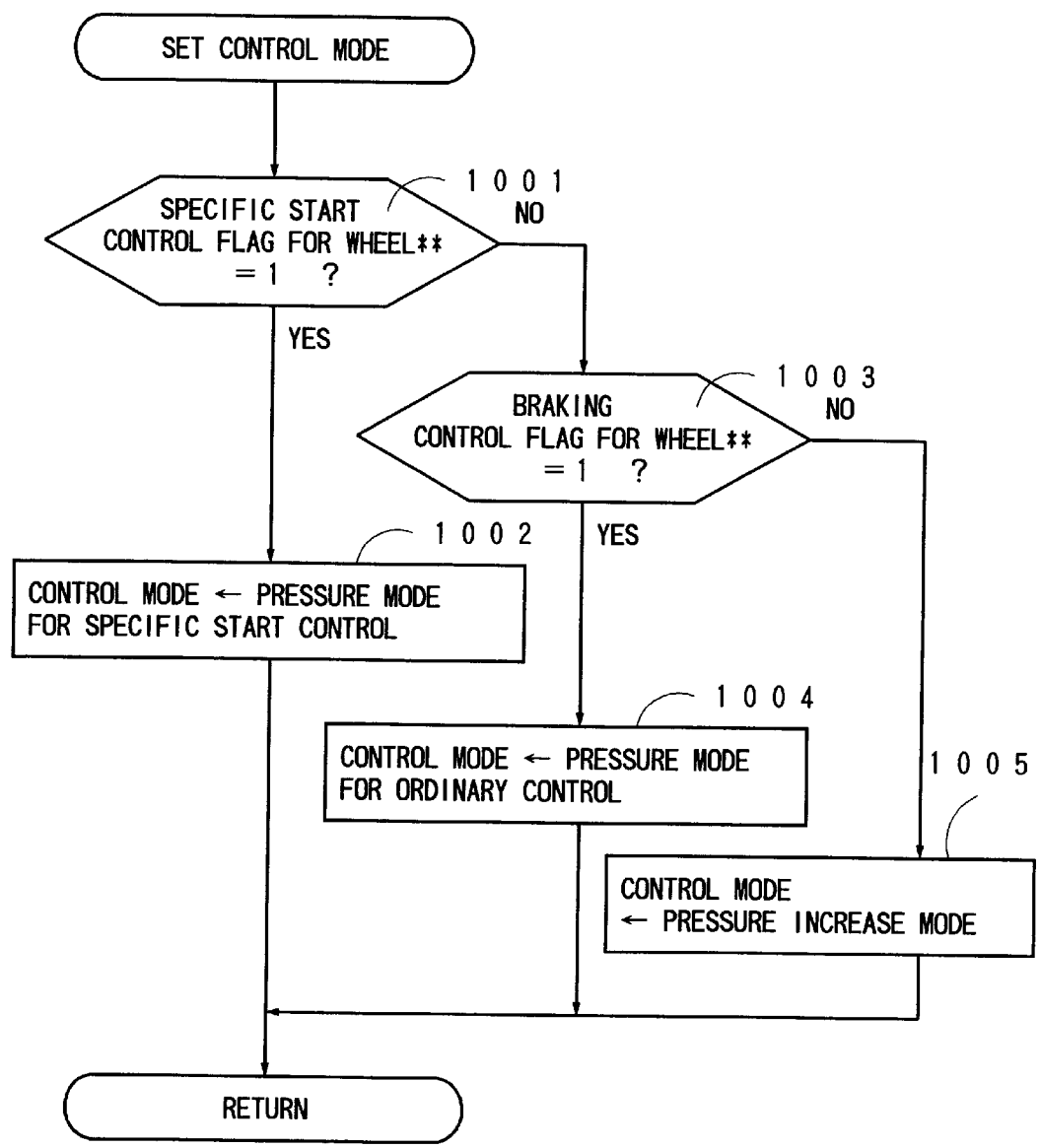
FIG. 13 is a flowchart showing a sub-routine for setting control modes for the braking control performed in the flowchart as shown in FIG. 4.

FIG. 13 shows the routine for setting the control mode executed at Step 115 in FIG. 4. At Step 1001, it is determined whether the specific start control flag for one of the wheels  is set, or not. If the flag for the wheel  has been set, the program proceeds to Step 1002, where the control mode is set to the pressure mode for the specific start control. If the specific start control flag for the wheel  has not been set, the program further proceeds to Step 1003, where it is determined whether the braking control flag for the wheel  is set, or not. If the result of the determination at Step 1003 is affirmative, the program proceeds to Step 1004, where the control mode is set to the pressure mode for the ordinary control. If the braking control flag for the wheel  has not been set, the program further proceeds to Step 1005, where the control mode is set to the pressure increase mode (i.e., in the normal braking condition). FIG. 13 shows the relationship between the braking control with the engine brake operated and the specific start control, while other control modes such as the traction control mode and the anti-skid control mode may be incorporated in FIG. 13**.

Figure 14:
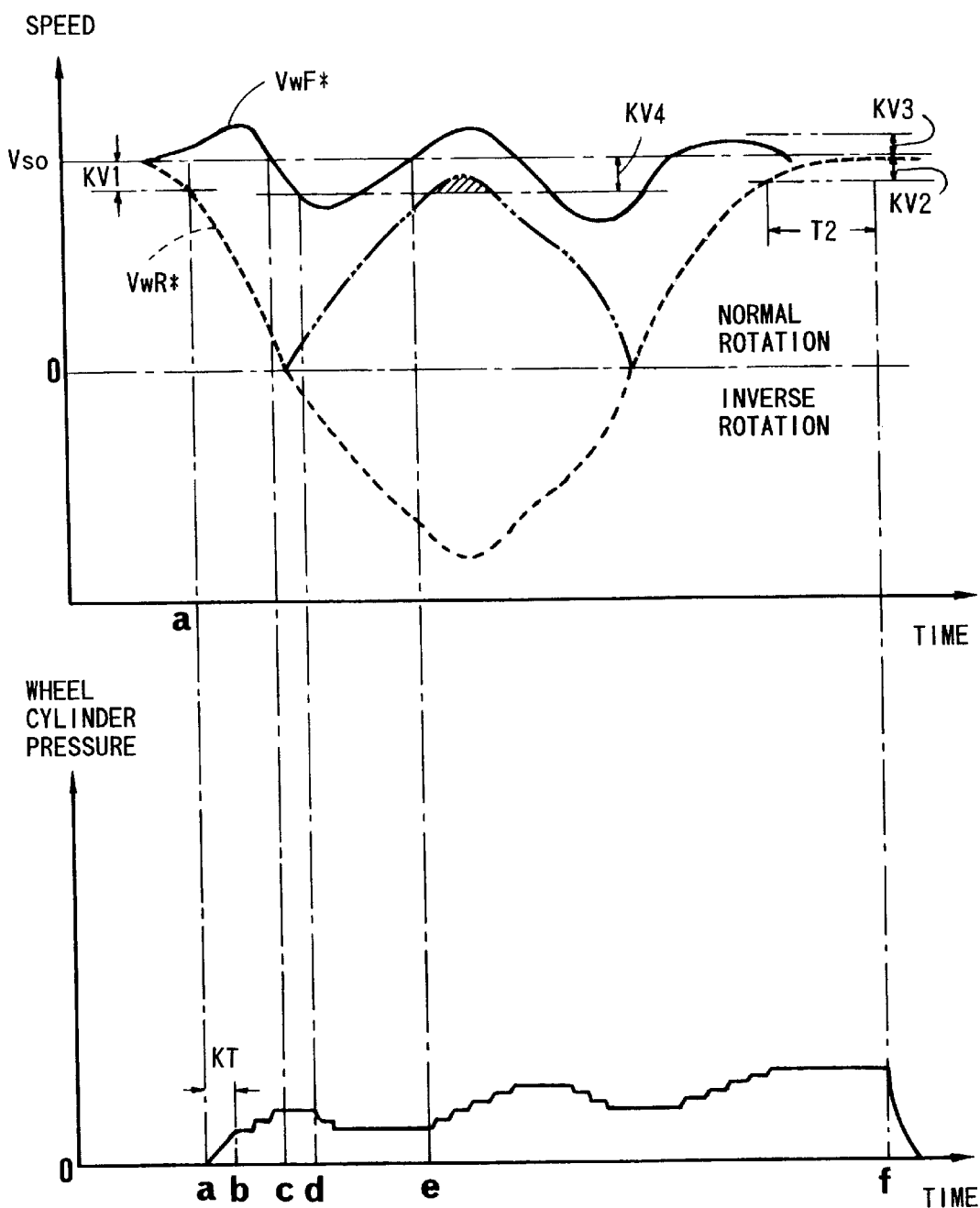
FIG. 14 is a diagram showing an example of the braking control performed according to an embodiment of the present invention.

Next, the above-described controlling operation will be explained with reference to FIG. 14, in the upper section of which the wheel speed VwF* of the front wheel FR or FL to be controlled is indicated by a solid line, and the wheel speed VwR* for the rear wheel RR or RL of the non-contact wheel is indicated by a broken line. The slip of the rear wheel RR or RL is determined at Steps 302–305 in FIG. 6. If the wheel speed VwR* is lower than the reference speed (Vso−KV1), and the wheel acceleration DVwR* (omitted in FIG. 14) is lower than the reference acceleration KG, the non-contact flag is set, and the braking control for the wheels FR, FL will be initiated. Referring to FIG. 14, the braking control for the wheels FR, FL is initiated at a position "a", so that the wheel cylinder pressure is increased as shown in the lower section of FIG. 14. During the period from the position "a" to a position "b" in FIG. 14, the specific start control is executed in accordance with the routine disclosed in FIGS. 9–11 to provide the rapid increase mode. After the position "b", the ordinary control as shown in FIG. 12 is executed, so that the pulse increase mode is selected until the wheel speed VwF* becomes lower than the estimated vehicle speed Vso at the position "c", and the hold mode is selected until the wheel speed VwF* becomes lower than the reference speed (Vso−KV4) at the position "d".

Then, if the wheel speed VwF* becomes lower than the reference speed (Vso−KV4), the pule decrease mode will be selected. And, if the wheel speed VwF* becomes to be indicative of a positive value, then the hold mode is selected until the position "e". If the wheel speed VwF* exceeds the estimated vehicle speed Vso at the position "e", the pulse increase mode is selected. Thereafter, the wheel cylinder pressure for the wheels FR, FL is controlled similarly. The braking control is terminated to decrease the wheel cylinder pressure at a position "f" in FIG. 14, when the predetermined time T2 has been elapsed with the wheel speed VwR* of the wheel RR or RL maintained between the reference speed (Vso−KV2) and the reference speed (Vso+KV3).

According to the present embodiment, when the four-wheel drive vehicle having the center differential goes downhill with the engine brake operated, and when the rear wheel RR or RL corresponds to the non-contact wheel, this wheel RR or RL will be rotated in the reverse direction, so that the wheel speed VwR* will be lower than the speed "0" to be of a negative value. However, the wheel speed sensors WS1–WS4, in general, can not distinguish between the normal rotation and the reverse rotation, so that each output signal will be varied as indicated by a two-dot chain line in FIG. 14, when the wheel is rotating in the reverse direction. That is, the output signal of the wheel speed sensor WS2 or WS4 will be of a positive value, even if the wheel RR or RL rotates in the reverse direction. As a result, the wheel speed VwR* may be indicated by a wheel speed which exceeds the reference speed (Vso−KV4), and which is different from the actual wheel speed, like the one in a zone as indicated by oblique lines in FIG. 14. Consequently, it might be determined erroneously that the speed VwR* has been recovered. According to the present embodiment, therefore, in order to determine that the wheel speed Vw** (VwR* in FIG. 14) has been recovered, it is required that the wheel speed Vw is maintained between the reference speed (Vso−KV2) and the reference speed (Vso+KV3) for the predetermined time T2. Then, it is clearly distinguished from the error which might be caused when the wheel rotates in the reverse direction. In this case, the requisite that the wheel speed Vw is lower than the reference speed (Vso+KV3) may be omitted, and only the requisite that the wheel speed Vw** is higher than the reference speed (Vso−KV2) may be used.

According to the present embodiment, therefore, in the case where the four-wheel drive vehicle having the center differential goes downhill with the engine brake operated, and where at least one of the rear wheels RR, RL comes to be in the non-contact condition, if the wheel speed VwR* is lower than the reference speed (Vso−KV1) of the first threshold level, and if the wheel acceleration DVwR* is lower than the reference acceleration KG, it can be determined that the wheel RR or RL corresponds to the non-contact wheel. And, in the case where the condition that the wheel speed VwR* exceeds the reference speed (Vso−KV2) of the second threshold level, and that the wheel speed VwR* is lower than the reference speed (Vso+KV3) of the third threshold level, has lasted for the predetermined time T2, it can be determined that the wheel RR or RL corresponds to the contact wheel. In this case, therefore, an appropriate braking operation can be performed by applying the braking force to the front wheels FR, FL.

Next, another embodiment of the present invention will be explained with reference to FIGS. 15–19. The basic arrangement of the present embodiment is substantially the same as that shown in FIGS. 2 and 3, so that its explanation is omitted. The main routine in the present embodiment is substantially the same as that disclosed in FIG. 4, except for Step 108, as will be described later in detail. The wheel speed sensors WS1–WS4 in the present embodiment are different from those in the former embodiment, while the same reference numerals are used hereinafter. In the present embodiment, they are capable of identifying the rotational direction of each wheel, i.e., distinguishing between the normal rotation (identified by "+"), which rotates in the moving direction of the vehicle, and the reverse rotation (identified by "−"), which rotates in the reverse direction of the vehicle. With respect to the sensors WS1–WS4, the rotational direction can be identified on the basis of a phase difference or the like, through a combination of outputs of a pair of detecting elements (not shown), for example.

According to the present embodiment, at Step 108 in the flowchart as shown in FIG. 4, a slip rate Sa of each wheel is calculated on the basis of the wheel speed Vw and the estimated vehicle speed Vso obtained at Steps 104, 105, respectively, in accordance with the following equation:

$$Sa^{**} = \{(Vso-Vw)/Vso\} \cdot 100(\%)$$

In this respect, if the rotational direction of the wheel corresponding to the moving direction of the wheel is set to be positive, and its reverse direction is set to be negative, the slip rate Sa will be of a negative value when an acceleration slip occurs, whereas the slip rate Sa will be of a positive value, which may exceed even 100%, when a deceleration slip occurs. With the slip rate Sa set as in the above, it can be effectively used in the calculations as described hereinafter. The sub-routines of the one corresponding to the determination of the downhill executed at Step 107 in FIG. 4, the one corresponding to the determination of starting the specific start control executed at Step 111 in FIG. 4, the one corresponding to the determination of terminating the specific start control executed at Step 112 in FIG. 4, and the one corresponding to the routine for setting the control mode executed at Step 115 in FIG. 4, which are executed in the present embodiment, are substantially the same as those disclosed in FIGS. 5, 9, 10 and 13**, respectively, so that only the routines different from those in the former embodiment will be explained hereinafter.

Figure 15:
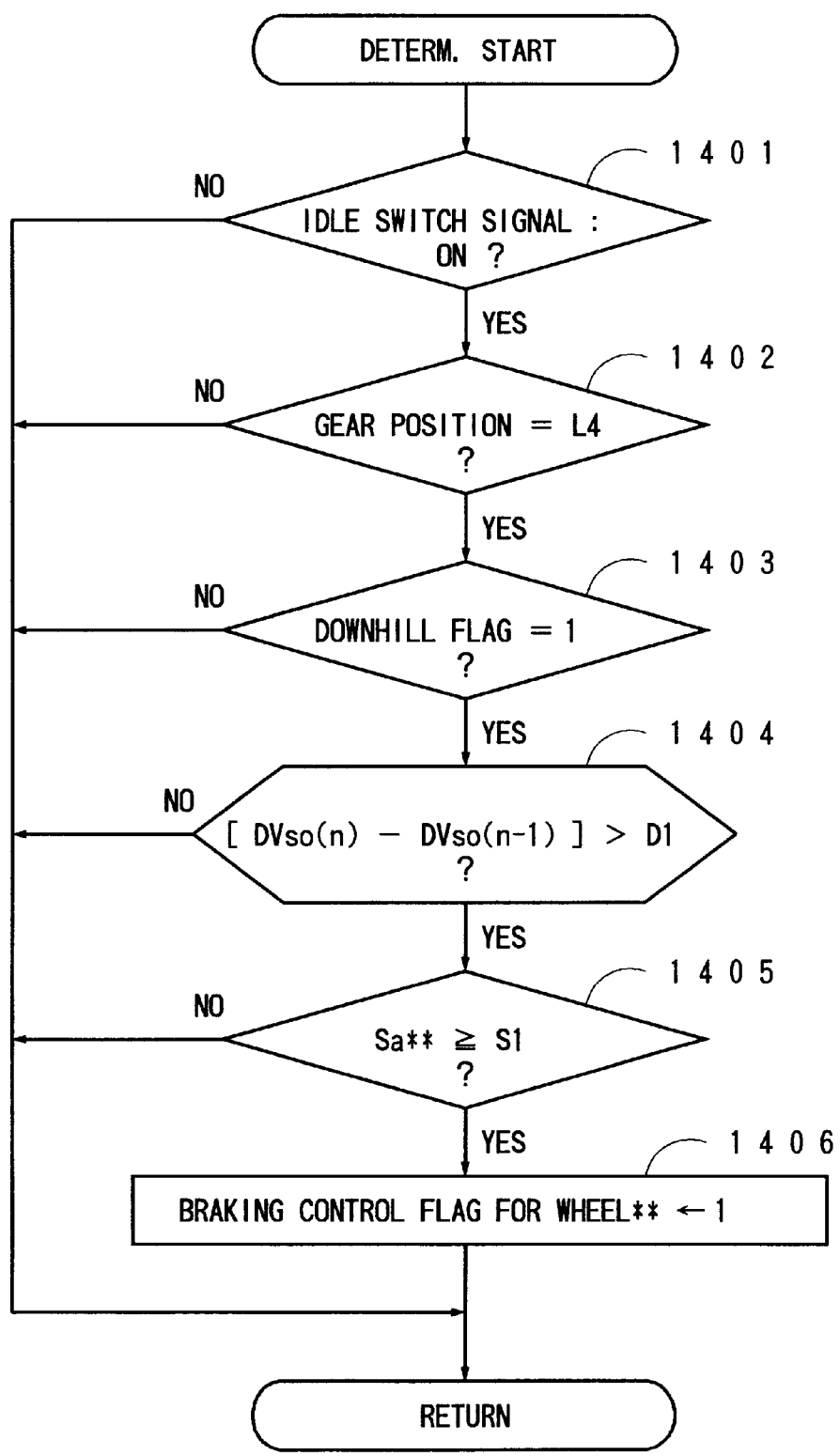
FIG. 15 is a flowchart showing a sub-routine for determining start of the braking control performed according to another embodiment of the present invention.

FIG. 15 shows the determination of starting the braking control executed according to the present embodiment. First, it is determined at Step 1401 whether the idle switch signal of the throttle sensor TS is on or off. If it is determined the idle switch signal is on, i.e., if the accelerator pedal AP is not operated, the program proceeds to Step 1402, where it is determined whether the transmission GS is shifted to the low range gear position L4, or not. If the result is affirmative, the program proceeds to Step 1403, where it is determined whether the downhill flag is set, or not. If the downhill flag is set, the program further proceeds to Step 1404 where an accelerating condition of the vehicle is determined. More specifically, it is determined whether a difference between an estimated acceleration DVso(n) in the present cycle and an estimated acceleration DVso(n−1) in the previous cycle has exceeded a predetermined acceleration D1 (0.05G, for example. "G" indicates a gravitational acceleration). If the difference has exceeded the predetermined acceleration D1, it means that the vehicle was being accelerated, so that it can be distinguished from the condition for starting the anti-skid control. According to the present embodiment, therefore, when all of the conditions defined in Steps 1401–1404 are satisfied, it is determined that the vehicle is under the engine brake, so that the program further proceeds to Steps 1405. When the engine brake is determined, some of the conditions as described above may be omitted, or other conditions may be added.

If it is determined at Step 1405 that the slip rate Sa of one of the wheels  exceeds the predetermined slip rate S1 (e.g., 30%), it is determined that the wheel  is not contacting the ground to rotate freely, so that the program proceeds to Step 1406, where the braking control flag is set with respect to the wheel . When it is determined that the slip rate Sa of the wheels  exceeds the predetermined slip rate S1, the condition for initiating the anti-skid control may be satisfied, at the same time. However, since it is made clear at Step 1404 that the vehicle has been driven to be accelerated, the condition determined at Step 1405 will not be confused with the condition for initiating the anti-skid control. In the case where any one of the conditions defined in Steps 1401–1405 is not satisfied, the program returns to the main routine as it is, so that the braking control for the wheel ** is not performed.

Figure 16:
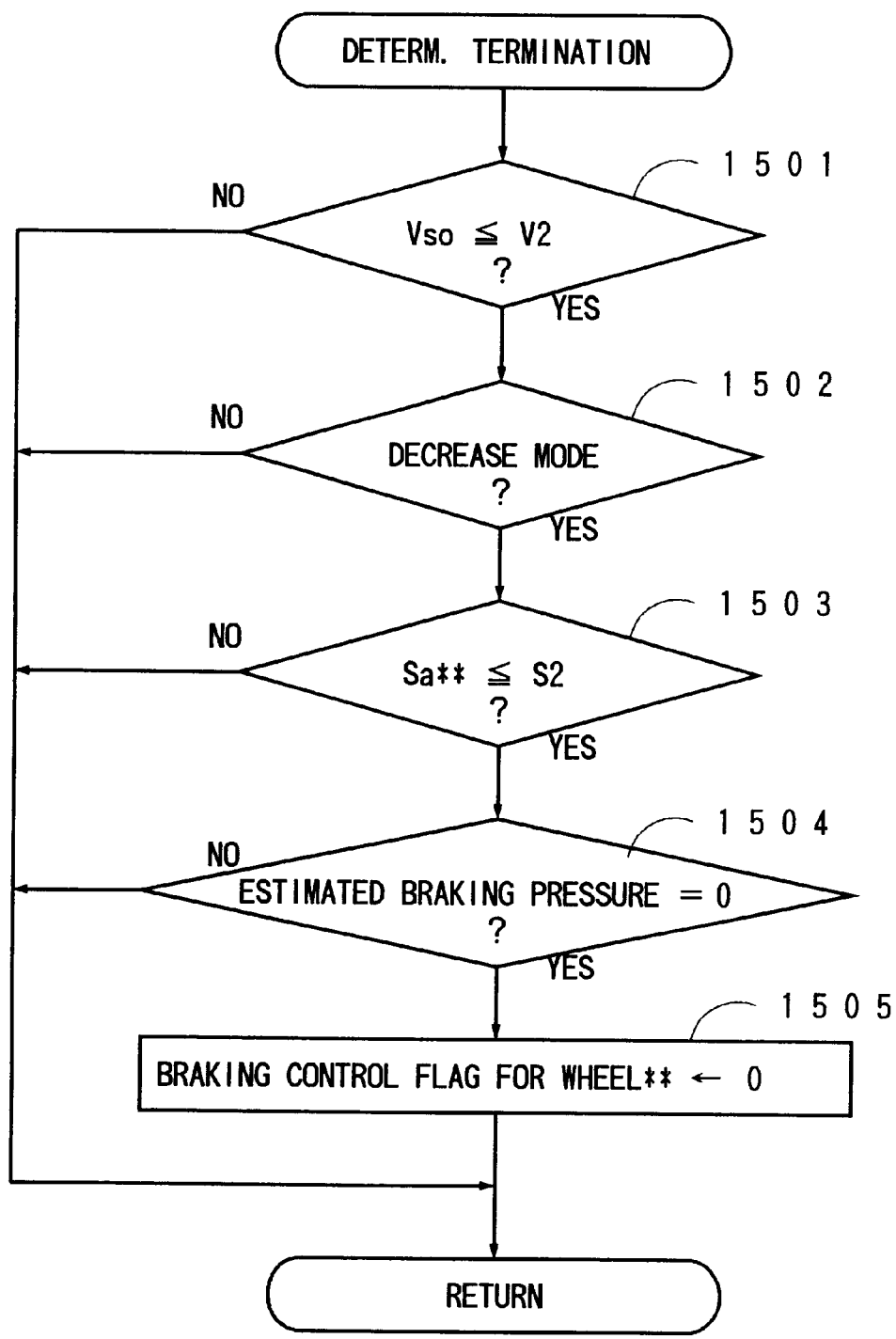
FIG. 16 is a flowchart showing a sub-routine for determining termination of the braking control performed according to another embodiment of the present invention.

FIG. 16 shows the determination of terminating the braking control, which is performed according to the present embodiment, and which corresponds to the routine executed at Step 110 in FIG. 4. It is determined at Step 1501 whether the estimated vehicle speed Vso is equal to or lower than a predetermined speed V2 (e.g., 15 km/h). If it is determined that the estimated vehicle speed Vso is equal to or lower than the predetermined speed V2, the program proceeds to Step 1502, where it is determined if the pressure mode is the decrease mode. When the pressure mode is the decrease mode, the program proceeds to Step 1503, where the slip rate Sa for the wheel  is compared with a predetermined slip rate S2 (e.g., 20%). If it is determined that the slip rate Sa is equal to or lower than the predetermined slip rate S2, the program proceeds to Step 1504, where the braking pressure is estimated to be zero (0), or not. If the braking pressure is estimated to be zero, as indicated by a position "f" in FIG. 19, so that it is determined that the braking operation has not been made, then the program proceeds to Step 1505, where the braking control flag is reset to be zero (0), and then the program returns to the main routine. In the case where any one of the conditions defined in Steps 1501–1504** is not satisfied, the program returns to the main routine as it is, to continue the braking control.

Figure 17:
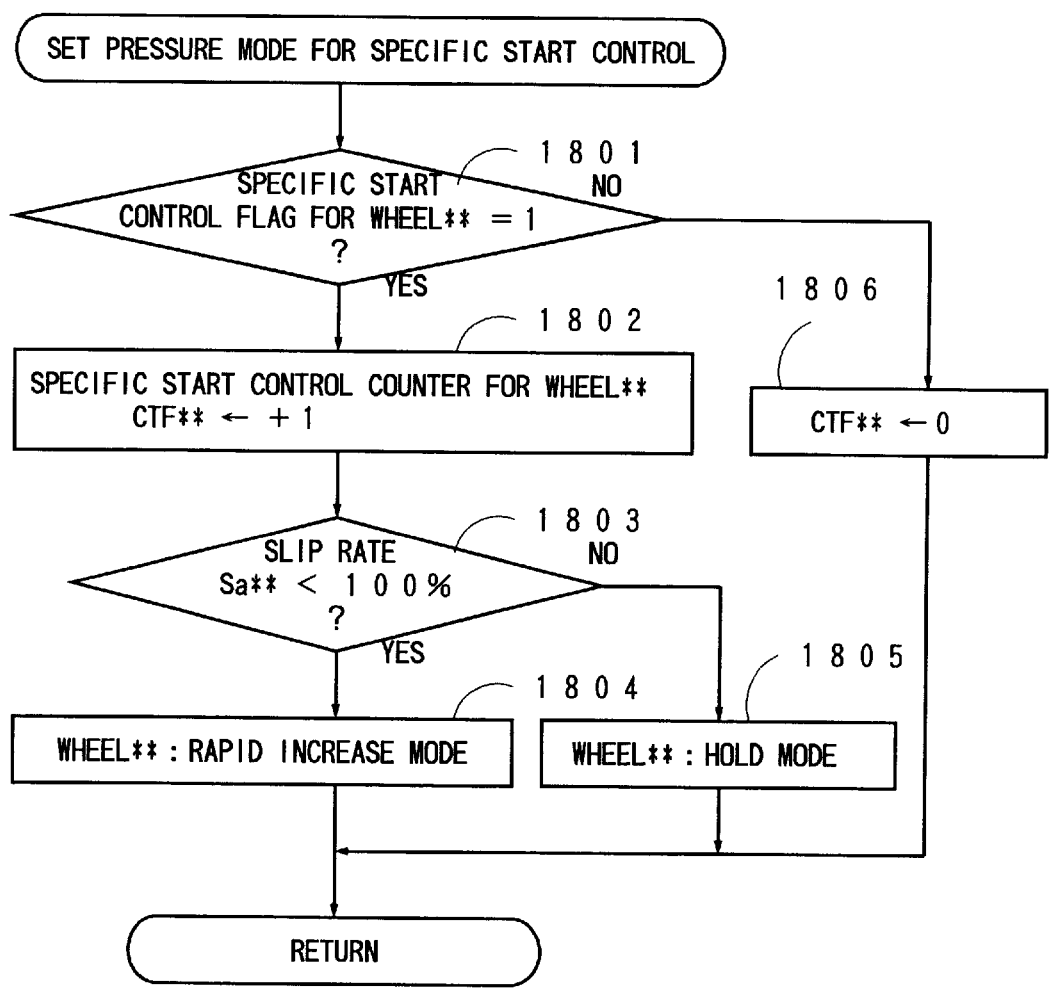
FIG. 17 is a flowchart showing a sub-routine for setting pressure modes for the specific start control in the braking control performed according to another embodiment of the present invention.

FIG. 17 shows the routine for setting a pressure mode for the specific start control, which is performed according to the present embodiment, and which corresponds to the routine executed at Step 113 in FIG. 4. At the outset, the state of the specific start control flag for the wheel  is determined at Step 1801. If the specific start control flag for the wheel  has been set, the program proceeds to Step 1802, where the specific start control counter CTF for the wheel  is incremented (+1), then proceeds to Step 1803, where the slip rate Sa is compared with 100%. If it is determined at Step 1803 that the slip rate Sa is smaller than 100%, it means that the wheel is rotating in the normal direction. In this case, therefore, the program proceeds to Step 1804, where the pressure mode with respect to the wheel  is set to the rapid increase mode, at a position as indicated by "a" in FIG. 19. On the contrary, if it is determined at Step 1803 that the slip rate Sa is equal to or larger than 100%, it means that the wheel  stops, or it is rotating in the reverse direction. Therefore, the program proceeds to Step 1805, where the pressure mode with respect to the wheel  is set to the hold mode, at a position as indicated by "b" in FIG. 19. If the specific start control flag for the wheel  has not been set, the program proceeds to Step 1806, where the specific start control counter CTF is cleared to be zero, and then the program returns to the main routine.

Figure 18:
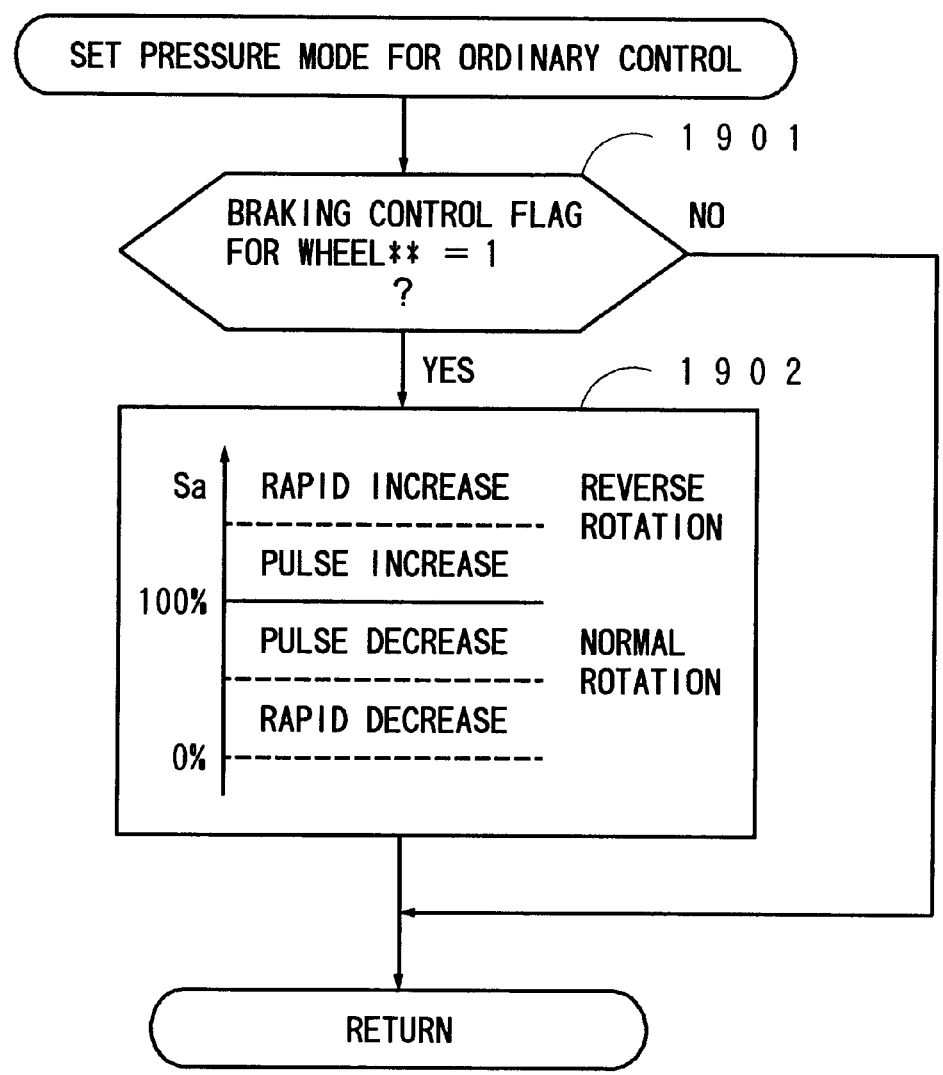
FIG. 18 is a flowchart showing a sub-routine for setting pressure modes for an ordinary control in the braking control performed according to another embodiment of the present invention.

FIG. 18 shows the routine for setting a pressure mode for the ordinary control, which is performed according to the present embodiment, and which corresponds to the routine executed at Step 114 in FIG. 4. At first, the state of the braking control flag for the wheel  is determined at Step 1901. If the braking control flag has not been set for the wheel , the program returns to the main routine. If the braking control flag for the wheel  has been set, the program proceeds to Step 1902, where one of the rapid increase mode, pulse increase mode, pulse decrease mode and rapid decrease mode is selected in accordance with a map as shown in Step 1902 in the FIG. 18. In this embodiment, the hold mode is included in the pulse increase mode (or, the pulse decrease mode), because the pulse increase (or, decrease) mode is based on a repetition of increasing (or, decreasing) the pressure and holding the pressure. In the zone, where the slip rate Sa is smaller than 100%, it is determined that the vehicle is travelling, with the wheel  rotating in the normal direction, whereas in the zone, where the slip rate Sa is equal to or larger than 100%, it is determined that the vehicle is travelling under the engine brake, with the wheel ** rotating in the reverse direction.

Figure 19:
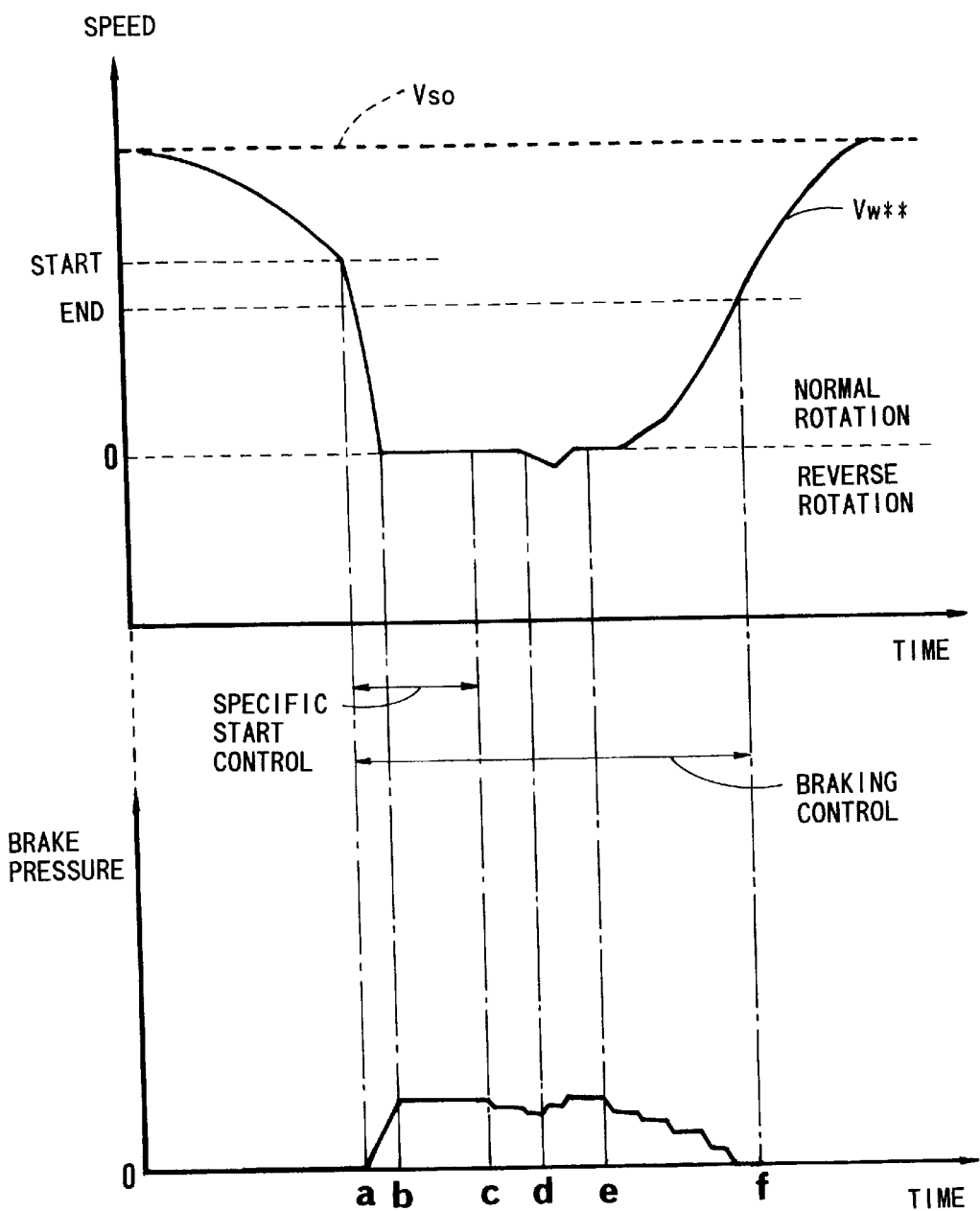
FIG. 19 is a diagram showing an example of the braking control performed according to another embodiment of the present invention.

The above-described controlling operation will be explained with reference to FIG. 19, wherein it is determined at the position "a" that the braking control has started, so that the rapid increase mode is set. During the predetermined period between the positions "a" and "c", the specific start control is performed in accordance with the flowchart as shown in FIG. 11. When the slip rate Sa has become 100% at the position "b", i.e., Vw=0 km/h, when the wheel stops, or its rotational direction is changed from the normal rotation to the reverse rotation, and vice versa, the wheel cylinder pressure is held, and if it is determined at the position "d" that the rotational direction of the wheel  has changed into the reverse rotation, the pulse increase mode is selected. Then, if it is determined at the position "e" that the wheel ** has returned to the normal rotation, the pulse decrease mode is selected. And, the pulse decrease mode is maintained until the braking control is terminated at the position "f", so that the wheel speed Vw is controlled to get close to the estimated vehicle speed Vso, gradually.

As described above, according to the specific start control in the present embodiment, once the wheel brake cylinder of the wheel  to be controlled is pressurized in accordance with the rapid increase mode until the wheel  is locked (i.e., Sa=100%), and then the pulse decrease mode is selected, the wheel  will begin to rotate in the normal direction or reverse direction. If the wheel  begins to rotate in the normal direction, it means that the wheel  has contacted the ground, the pulse decrease mode is selected, whereas if the wheel  begins to rotate in the reverse direction, it means that the wheel  is rotating freely, the increase mode is maintained to keep the wheel  in its locked condition. Thus, by controlling the pressure in the wheel brake cylinder of the wheel  to be controlled, with the slip rate Sa maintained near 100% (i.e., Vw=0 km/h), the engine brake can be effectively operated with respect to the other wheels, even if the vehicle is traveling on a rough and steep downhill road.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A braking control system for controlling a braking force applied to each of front and rear wheels of a four-wheel drive vehicle having a front differential gear connected to said front wheels, a rear differential gear connected to said rear wheels, and a center differential gear connected to said front and rear differential gears, comprising:

wheel speed detection means for detecting wheel speeds of said front and rear wheels of said vehicle;

non-contact detection means for determining whether at least one wheel of said vehicle is not contacting the ground in the vehicle's path, on the basis of the wheel speeds detected by said wheel speed detection means;

downhill detection means for determining whether the vehicle's path is on a downhill road;

engine brake detection means for determining whether said vehicle is under an engine brake; and braking force controlling means for controlling a braking force applied to each of said front and rear wheels independently, said braking force controlling means applying the braking force to at least one of said front and rear wheels of said vehicle, when said downhill detection means determines that the vehicle's path is on the downhill road, said engine brake detection means determines that said vehicle is under the engine brake, said vehicle is in a non-braking condition, and said non-contact detection means determines that said at least one wheel is not contacting the ground.

2. A braking control system as set forth in claim 1, wherein said non-contact detection means includes slip detection means for detecting a slip of each of said wheels on the basis the wheel speeds detected by said wheel speed detection means, and wherein said non-contact detection means determines that said at least one wheel is not contacting the ground, when said slip detection means detects the slip of said at least one wheel.

3. A braking control system as set forth in claim 2, further comprising means for calculating an estimated vehicle speed on the basis of the wheel speeds detected by said wheel speed detection means, wherein said slip detection means includes slip rate calculating means for calculating a slip rate of each of said wheels on the basis of the wheel speeds and the estimated vehicle speed, and detects the slip of said at least one wheel on the basis of the slip rate calculated by said slip rate calculating means.

4. A braking control system as set forth in claim 1, further comprising means for calculating an estimated vehicle speed on the basis of the wheel speeds detected by said wheel speed detection means, wherein said non-contact detection means determines that said at least one wheel is not contacting the ground in the vehicle's path, when the wheel speed of said at least one wheel is lower than a first threshold level obtained by subtracting a first predetermined value from the estimated vehicle speed.

5. A braking control system as set forth in claim 4, further comprising contact detection means for determining that said at least one wheel is contacting the ground in the vehicle's path, when the wheel speed of said at least one wheel continues to be higher than a second threshold level obtained by subtracting a second predetermined value from the estimated vehicle speed, for a predetermined period of time, and wherein said braking force control means releases the braking force applied to said at least one wheel, when said contact detection means determines that said at least one wheel is contacting the ground.

6. A braking control system as set forth in claim 5, wherein said contact detection means determines that said at least one wheel is contacting the ground in the vehicle's path, when the wheel speed of said at least one wheel continues to be higher than the second threshold level obtained by subtracting the second predetermined value from the estimated vehicle speed, and lower than a third threshold level obtained by adding a third predetermined value to the estimated vehicle speed, for a predetermined period of time.

7. A braking control system as set forth in claim 1, wherein said braking force controlling means applies the braking force to both of said front wheels of said vehicle, when said downhill detection means determines that the vehicle's path is on the downhill road, said engine brake detection means determines that said vehicle is under the engine brake, and said non-contact detection means determines that said at least one wheel is not contacting the ground.

8. A braking control system as set forth in claim 7, wherein said non-contact detection means includes slip detection means for detecting a slip of each of said wheels on the basis of the wheel speeds detected by said wheel speed detection means, and wherein said braking force controlling means applies the braking force to both of said front wheels of said vehicle, when said downhill detection means determines that the vehicle's path is on the downhill road, said engine brake detection means determines that said vehicle is under the engine brake, and said slip detection means detects the slip of said at least one wheel.

9. A braking control system as set forth in claim 1, wherein said braking force controlling means applies the braking force to said at least one wheel which is not contacting the ground, when said downhill detection means determines that the vehicle's path is on the downhill road, said engine brake detection means determines that said vehicle is under the engine brake, and said non-contact detection means determines that said at least one wheel is not contacting the ground.

10. A braking control system as set forth in claim 9, wherein said non-contact detection means includes slip detection means for detecting a slip of each of said wheels on the basis the wheel speeds detected by said wheel speed detection means, and wherein said braking force controlling means applies the braking force to both of said front wheels of said vehicle, when said downhill detection means determines that the vehicle's path is on the downhill road, said engine brake detection means determines that said vehicle is under the engine brake, and said slip detection means detects the slip of said at least one wheel.

11. A braking control system as set forth in claim 10, further comprising means for calculating an estimated vehicle speed on the basis of the wheel speeds detected by said wheel speed detection means, wherein said slip detection means includes slip rate calculating means for calculating a slip rate of each of said wheels on the basis of the wheel speeds and the estimated vehicle speed, and detects the slip of said at least one wheel on the basis of the slip rate calculated by said slip rate calculating means.

12. A braking control system as set forth in claim 11, wherein said braking force controlling means terminates applying the braking force to said at least one wheel, if the slip rate thereof is smaller than a predetermined rate, when the braking force is applied to said at least one wheel until said at least one wheel is substantially locked, and thereafter the braking force applied to said at least one wheel is reduced, and wherein said braking force controlling means continues to apply the braking force to said at least one wheel, if the slip rate thereof is greater than the predetermined rate, when the braking force is applied to said at least one wheel until said at least one wheel is substantially locked, and thereafter the braking force applied to said at least one wheel is reduced.

13. A braking control system as set forth in claim 1, wherein said downhill detection means includes tilt detection means for detecting a tilt angle of said vehicle, and determines that the vehicle's path is on the downhill road, when said tilt detection means detects the tilt angle tilted more than a predetermined angle, provided that the moving direction of said vehicle corresponds to the downward direction of the downhill road, for a predetermined period of time.

14. A braking control system as set forth in claim 1, wherein said engine brake detection means includes gear position detection means for detecting a gear position of a transmission of said vehicle, and determines that said vehicle is under the engine brake, at least when said gear position detection means detects a predetermined gear position for providing a relatively low vehicle speed, and when said downhill detection means determines that the vehicle's path is on the downhill road.

15. A braking control system for controlling a braking force applied to each of front and rear wheels of a four-wheel drive vehicle having a front differential gear connected to said front wheels, a rear differential gear connected to said rear wheels, and a center differential gear connected to said front and rear differential gears, comprising:

wheel speed detection means for detecting wheel speeds of said front and rear wheels of said vehicle;

non-contact detection means for determining whether at least one wheel of said vehicle is not contacting the ground in the vehicle's path, on the basis of the wheel speeds detected by said wheel speed detection means;

downhill detection means for determining whether the vehicle's path is on a downhill road;

engine brake detection means for determining whether said vehicle is under an engine brake; and braking force controlling means for controlling a braking force applied to each of said front and rear wheels independently, said braking force controlling means applying the braking force to at least one of said front and rear wheels of said vehicle, when said downhill detection means determines that the vehicle's path is on the downhill road, said engine brake detection means determines that said vehicle is under the engine brake, and said non-contact detection means determines that said at least one wheel is not contacting the ground, wherein said engine brake detection means includes gear position detection means for detecting a gear position of a transmission of said vehicle, and determines that said vehicle is under the engine brake, at least when said gear position detection means detects a predetermined gear position for providing a relatively low vehicle speed, and when said downhill detection means determines that the vehicle's path is on the downhill road.

* * * * *

UNITED STATES PATENT AND TRADEMARK OFFICE
CERTIFICATE OF CORRECTION

PATENT NO. : 6,076,898
DATED : June 20, 2000
INVENTOR(S) : T. OTA, et al.

It is certified that error appears in the above-identified patent and that said Letters Patent is hereby corrected as shown below:

The following additional Assignee is added to Section [73]:

Toyota Jidosha Kabushiki Kaisha, Toyota City, Japan.

Signed and Sealed this

Eighth Day of May, 2001

Attest:

NICHOLAS P. GODICI

*Attesting Officer*  *Acting Director of the United States Patent and Trademark Office*